(12) United States Patent
Gracyalny et al.

(10) Patent No.: US 6,311,663 B2
(45) Date of Patent: Nov. 6, 2001

(54) STARTING AND STOPPING DEVICE FOR INTERNAL COMBUSTION ENGINE

(75) Inventors: Gary J. Gracyalny, Milwaukee; Robert K. Mitchell, Brookfield; Art Poehlman, West Bend; Richard Dykstra, Cedar Grove; Steven Dethloff, Pewaukee, all of WI (US); Charles Brown, New Dehli (IN); Paul Tharman, Pewaukee, WI (US); John Santi, West Allis, WI (US); Dick Seilenbinder, Hales Corners, WI (US); Aaron Jerabek, Milwaukee, WI (US); John Feldner, Hubertus, WI (US); Stanely Filipak, Dousman, WI (US)

(73) Assignee: Briggs & Stratton Corporation, Milwaukee, WI (US)

( * ) Notice: Subject to any disclaimer, the term of this patent is extended or adjusted under 35 U.S.C. 154(b) by 0 days.

(21) Appl. No.: 09/780,109

(22) Filed: Feb. 9, 2001

Related U.S. Application Data

(62) Division of application No. 09/183,425, filed on Oct. 30, 1998, now Pat. No. 6,230,678.

(51) Int. Cl.$^7$ .................................................... F02N 5/02
(52) U.S. Cl. .................... 123/185.14; 74/7 C; 185/41 A; 192/45
(58) Field of Search ...................... 123/185.14; 185/41 A; 74/7 C; 192/42, 45

(56) References Cited

U.S. PATENT DOCUMENTS

| 932,735 | 8/1909 | Willard . |
|---|---|---|
| 950,848 | 3/1910 | Gardner . |
| 1,009,503 | 11/1911 | Goodhart . |
| 1,022,087 | 4/1912 | Jenney . |
| 1,097,899 | 5/1914 | Volkmar . |
| 1,099,685 | 6/1914 | Bennett . |

(List continued on next page.)

FOREIGN PATENT DOCUMENTS

| 2639677 | 6/1990 | (FR) . |
|---|---|---|
| 58051271 | 3/1983 | (JP) . |
| 62-53703 | 3/1983 | (JP) . |

OTHER PUBLICATIONS

16 CFR Sec. 1205.1 —1205.36, see specifically 16 CFR 1205(a) and (c), published prior to Oct. 30, 1997 by the Office of the Federal Register National Archives and Records Administration, United States of America.

Primary Examiner—Andrew M. Dolinar
(74) Attorney, Agent, or Firm—Michael Best & Friedrich, LLP

(57) ABSTRACT

An internal combustion engine includes an engine housing, a crankshaft supported within the engine housing for rotation with respect to the engine housing, and a flywheel fixedly mounted to the crankshaft and rotatable with the crankshaft in a starting direction to start the engine. A coil spring has an outer end fixedly interconnected with respect to the engine housing, and an inner end. A unidirectional clutch has a portion connected to the inner end of the spring. The unidirectional clutch is characterized by an interference condition in which the unidirectional clutch couples the inner end of the spring to the flywheel such that the flywheel and crankshaft may be rotated in the starting direction in response to unloading of the spring. The unidirectional clutch is also characterized by a non-interference condition in which the inner end of the spring is uncoupled from the flywheel. An input assembly is interconnected with the spring and selectively movable into contact with flywheel to load the spring in response to rotation of the flywheel. A locking mechanism selectively prevents the spring from unloading, and at least one manual actuator is actuable to disengage the locking mechanism from the spring to enable unloading of the spring.

12 Claims, 12 Drawing Sheets

U.S. PATENT DOCUMENTS

| | | |
|---|---|---|
| 1,137,358 | 4/1915 | Sinclair . |
| 1,936,554 | 11/1933 | Lansing . |
| 2,293,322 | 8/1942 | Veach . |
| 2,922,411 | 1/1960 | Skinner . |
| 3,151,605 | 10/1964 | Tillotson et al. . |
| 3,165,100 | 1/1965 | Svendsen . |
| 3,290,871 | 12/1966 | Haas . |
| 3,301,243 | 1/1967 | Lyvers . |
| 3,324,842 | 6/1967 | Haas . |
| 3,375,814 | 4/1968 | Hamman . |
| 3,395,687 | 8/1968 | Harkness . |
| 3,447,523 | 6/1969 | Bradbury et al. . |
| 3,692,010 | 9/1972 | Dooley et al. . |
| 3,853,109 | 12/1974 | Dooley . |
| 3,861,374 * | 1/1975 | Dooley et al. .................. 123/185.14 |
| 4,067,243 | 1/1978 | Kurata et al. . |
| 4,104,927 | 8/1978 | Jensen et al. . |
| 4,176,648 | 12/1979 | Gotoh et al. . |
| 4,230,084 | 10/1980 | Gotoh et al. . |
| 4,363,298 | 12/1982 | Kuhn . |
| 4,441,466 | 4/1984 | Tangorra . |
| 5,086,890 | 2/1992 | Turczyn et al. . |
| 5,186,134 | 2/1993 | Morishima et al. . |
| 5,431,136 | 7/1995 | Tyler . |
| 5,537,966 | 7/1996 | Ohnishi . |
| 5,596,902 | 1/1997 | McMillen . |
| 5,970,940 | 10/1999 | Penton . |

\* cited by examiner

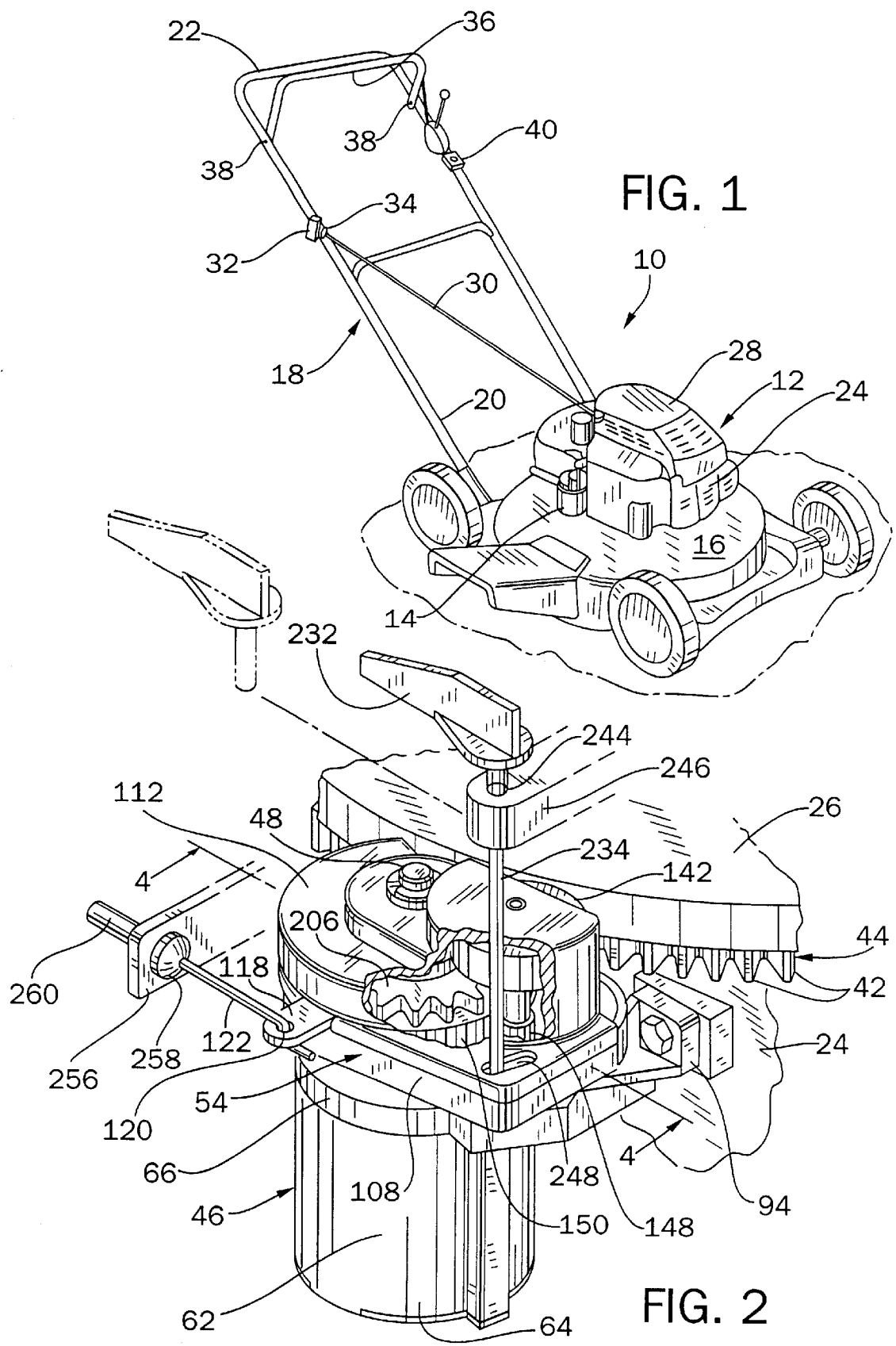

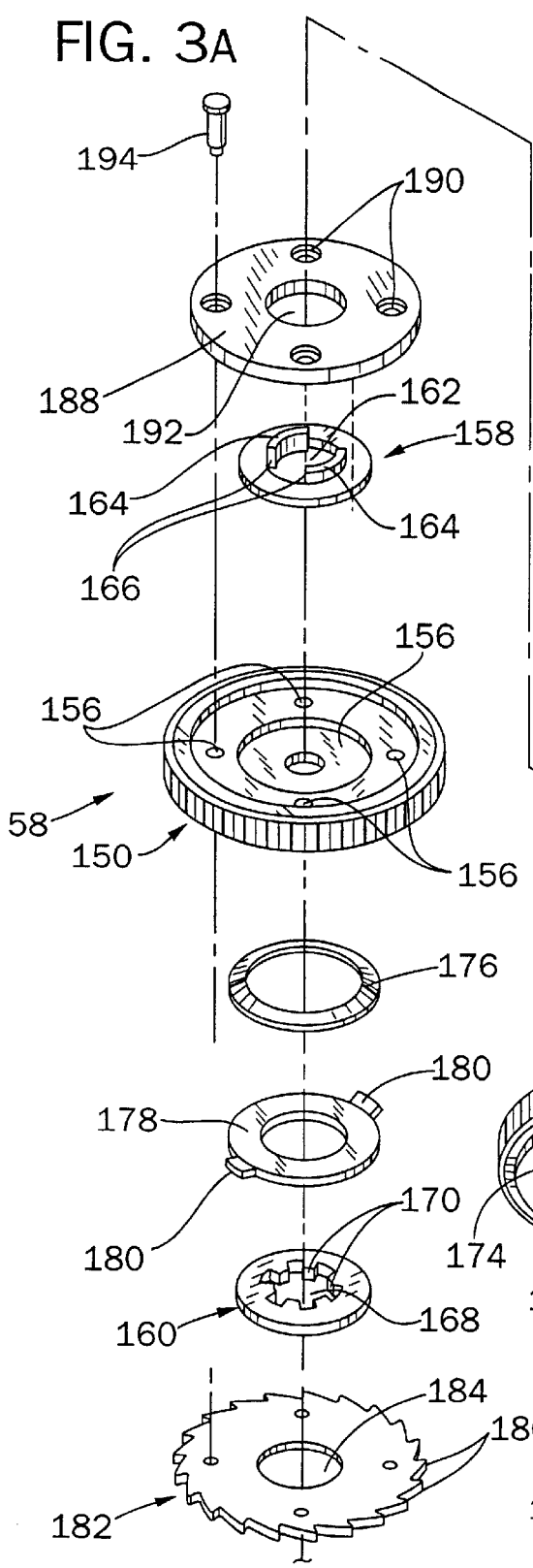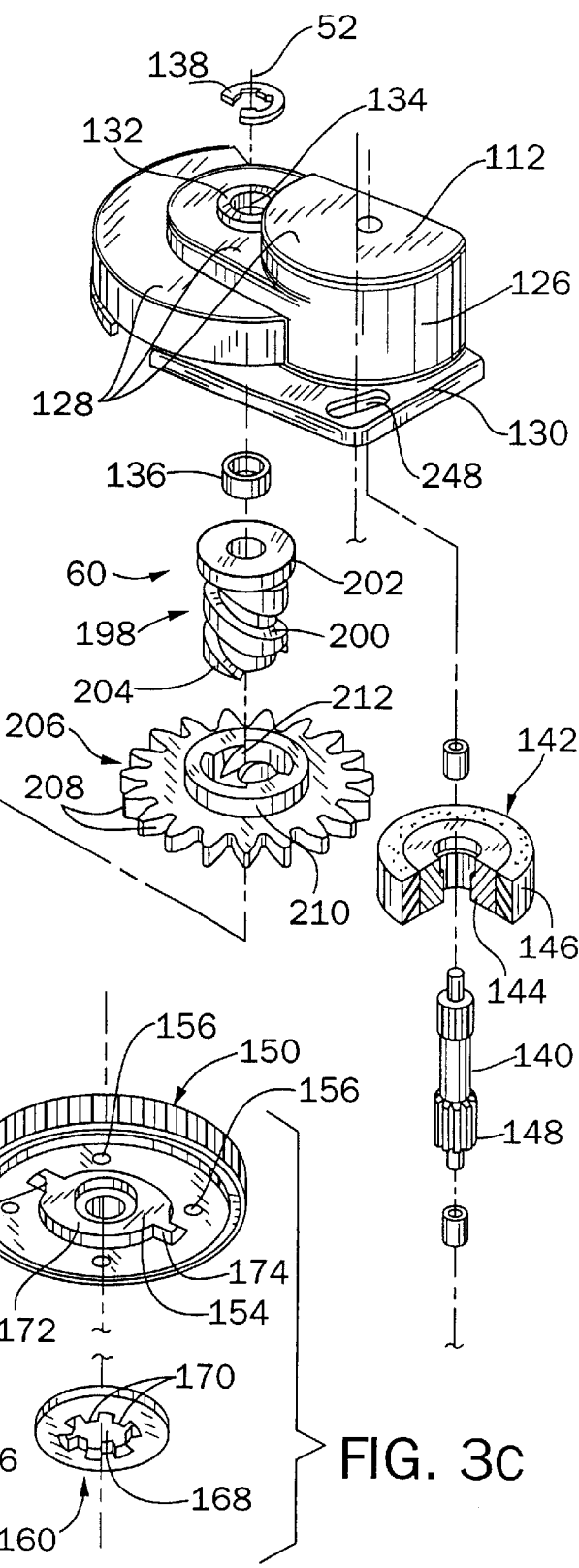

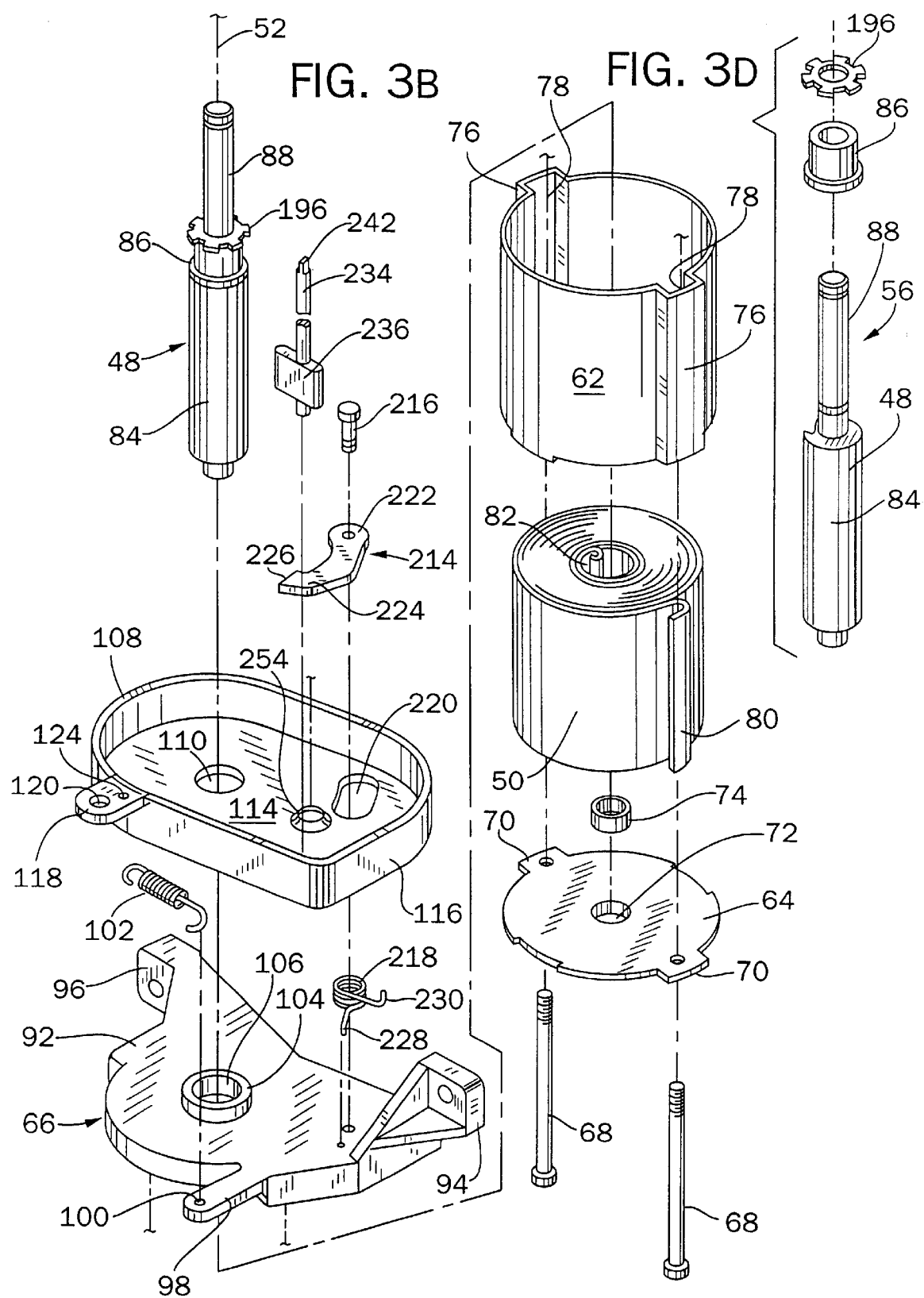

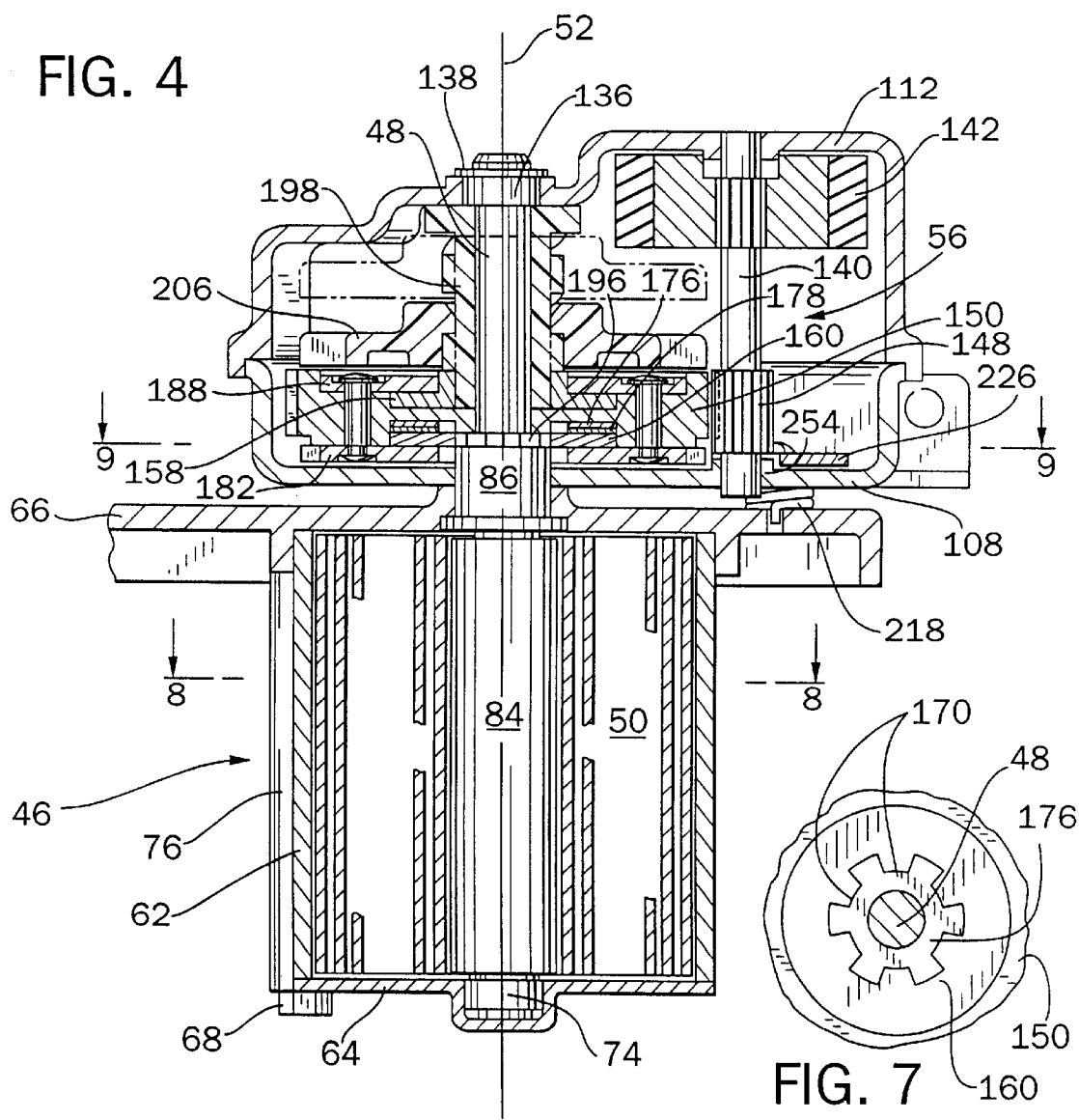
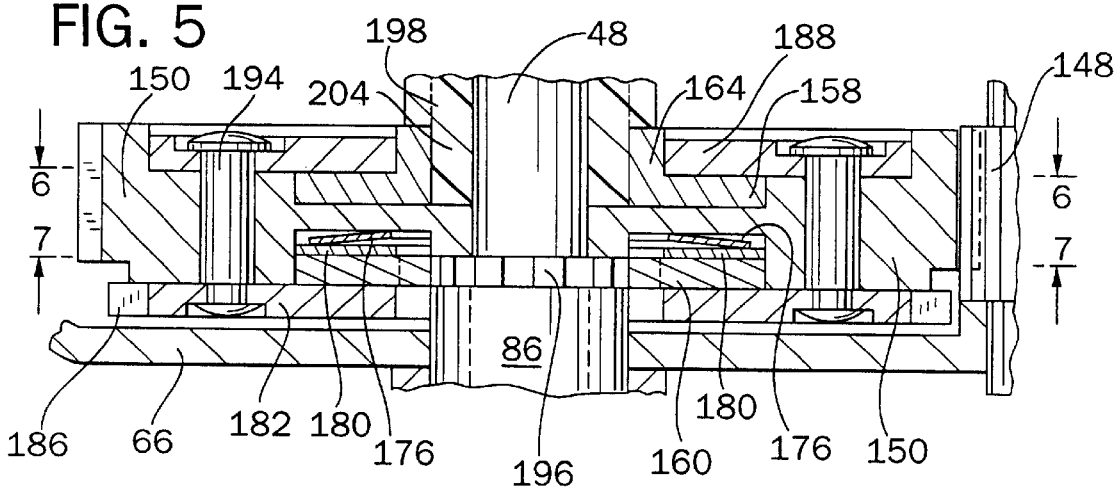

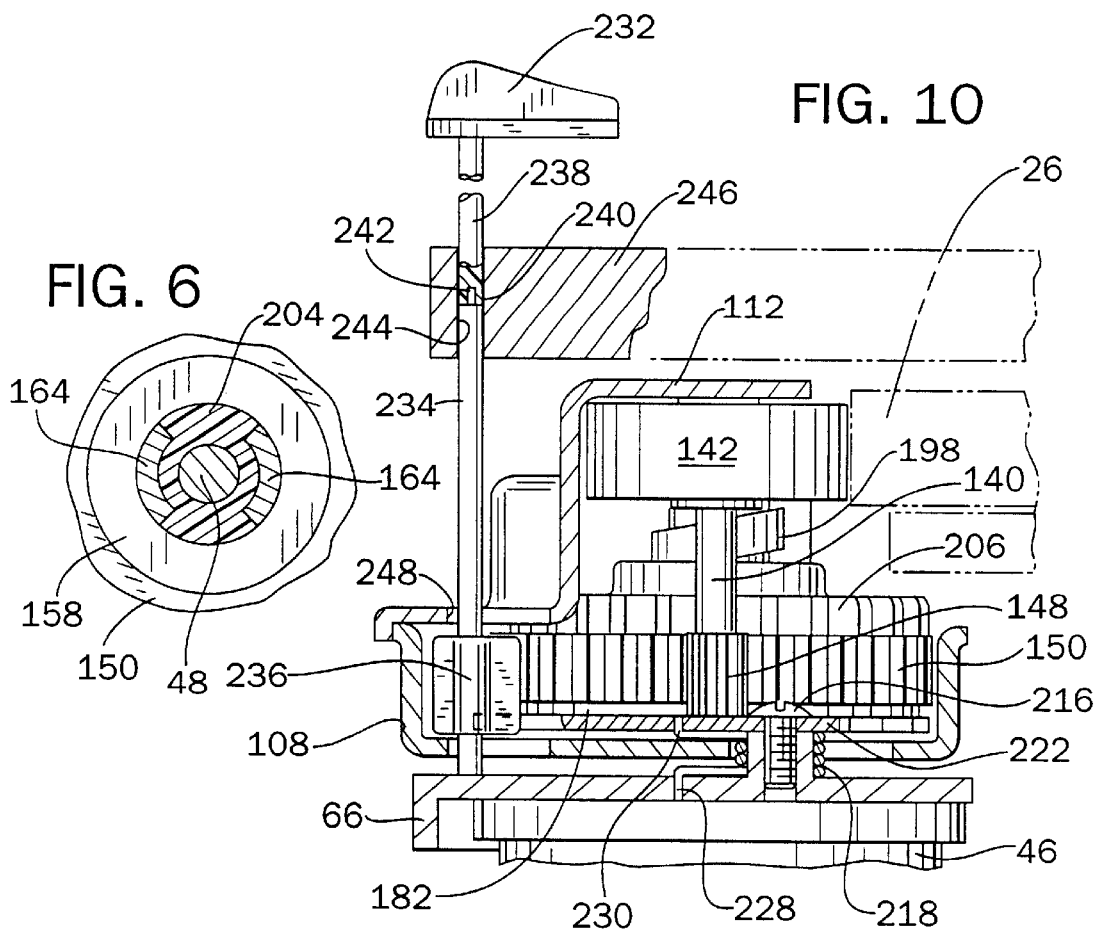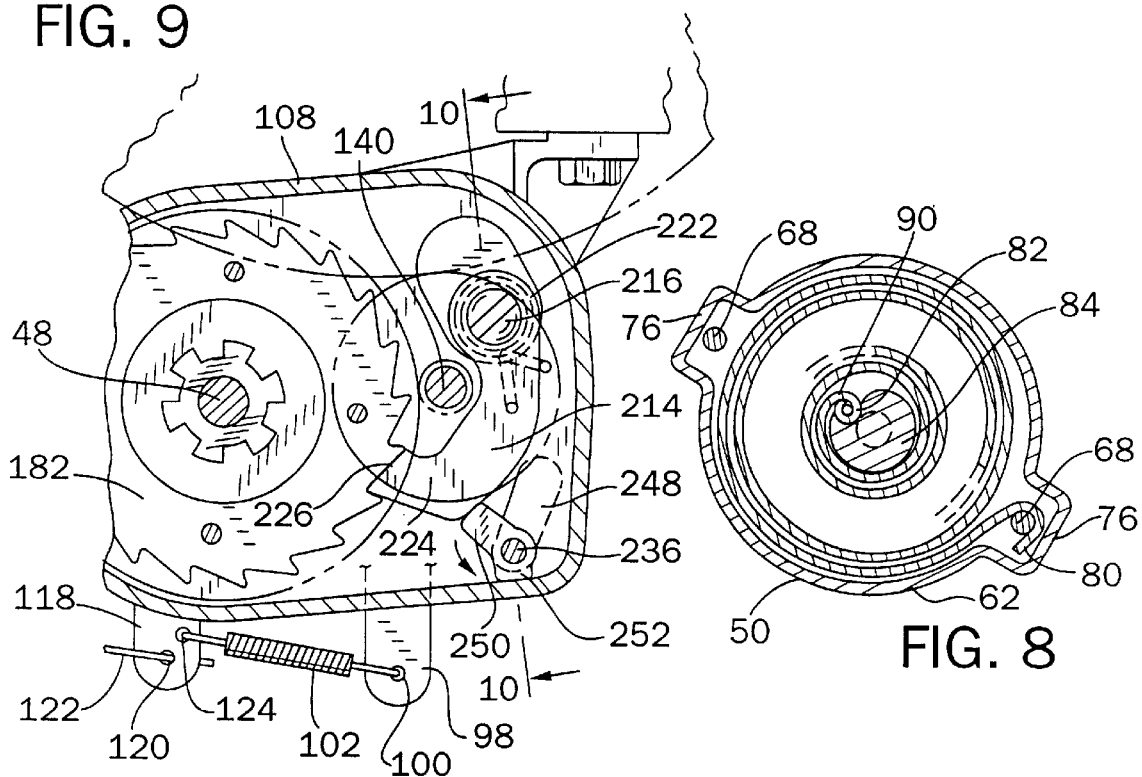

STARTING AND STOPPING DEVICE FOR INTERNAL COMBUSTION ENGINE

This divisional application claims the benefit of U. S. application Ser. No. 09/183,425, filed Oct. 30, 1998 now U.S. Pat. No. 6,230,678, the entire contents of which is incorporated herein by reference.

BACKGROUND OF THE INVENTION

The present invention relates generally to an internal combustion engine. The present invention also relates to a device and method for starting the internal combustion engine, and, more specifically, to an engine starting device that is capable of storing energy in an elastic member and then releasing the energy to start the engine. The present invention also relates to a device and method for stopping the internal combustion engine or, at least, for absorbing energy of the engine upon shutdown. The engine starting device is particularly adapted for use with small internal combustion engines such as those provided on power lawn mowers, generators, snow blowers, garden tractors, and other machinery.

Small internal combustion engines have been equipped with manually operable recoil starters which include a central shaft, a rope pulley rotatable about the central shaft, retractable clutches or dogs connected to the rope pulley and a starter rope wrapped around the rope pulley. The starter rope may be pulled to rotate the rope pulley in a starting direction, such that the dogs engage the flywheel, and the flywheel and the crankshaft are also rotated in a starting direction. The engine is then driven through a number of revolutions sufficient for starting.

Although recoil starters of the type described above are commonly used with small internal combustion engines, there are certain disadvantages inherent in their operation. For example, the operator must possess a sufficient amount of strength and manual dexterity to pull the starter rope to rotate the flywheel and crankshaft. Under some conditions, the operator may have to pull the starter rope several times before the engine is successfully started. For some operators, this is a mere inconvenience. For other operators, including the elderly and the physically challenged, pulling a starter rope multiple times may present a difficult task.

An alternative to recoil starters and other manual starters are automatic starters which include a battery-powered electric motor for driving the flywheel through initial starting revolutions. Such a starter may be actuated by merely activating an electrical switch in the form of a push button or key device. Although this concept provides an engine starting device that is both easy to operate and generally effective, the electric motor, the battery used to power the motor, and associated components can add weight and cost to an engine. For small internal combustion engines such as those intended for use with lawn mowers, generators, and like machines, adding even a small amount of weight and cost to the engine can negatively impact the market competitiveness of the engine and/or the machine.

Another type of automatic starter is an engine starting device that utilizes stored energy in a spring to rotate the crankshaft and to start the engine. In these engine starting devices a mechanism must be provided to wind the spring. For example, U.S. Pat. No. 1,936,554, which is assigned to Briggs and Stratton Corporation (the assignee of the present invention) discloses an electric motor that is positioned adjacent the spring and which may be operated to wind the spring. It is also known to provide a manual crank mechanism interconnected with the spring and operable to wind the spring. Further, it is known to provide a winding mechanism interconnected with the crankshaft that is operable to wind the spring during normal engine running conditions.

SUMMARY OF THE INVENTION

In an internal combustion engine having a rotatable engine assembly or member, such as an assembly comprising a crankshaft, flywheel and output device (e.g., a cutting blade), the rotatable engine member contains kinetic energy due to its angular momentum after the engine ignition is shut-off by an operator. In some applications, the angular momentum is sufficient to move the rotatable engine member through multiple revolutions. A general feature and advantage of the present invention is a device or mechanism for utilizing the energy inherent in a rotatable or rotating engine member or assembly of a small internal combustion engine after the operator initiates shutdown of the engine (e.g., by operating a switch in a magneto or battery ignition system). More particularly, it is a feature and an advantage of the invention to provide, in such a mechanism or device, an engine starting device adapted for use with small internal combustion engines, and alternatively, to provide a machine that incorporates such an engine starting device.

For purposes of description, the terms "shutdown" and "shut-off" shall apply to the operation of a switch in the ignition system or an equivalent mechanism to turn the engine off. These terms shall also apply to any operation that effects the same result. The term "engine coast down" shall apply to the condition, status, or phase of the engine and/or rotatable engine member after engine "shutdown" or "shut-off" is initiated, but before the rotatable engine member ceases movement or rotation.

It is yet another feature and an advantage of the invention to provide a mechanism for braking a rotatable engine member upon engine shutdown, wherein the energy of the rotatable engine member is absorbed and/or stored by the braking mechanism.

It should be noted that, in the United States and other countries, a device is required on lawn mowing machines for arresting the rotation of the cutting blade within a specific time period after the operator initiates engine shutdown. Typically, the cutting blade is connected to the crankshaft such that it stops rotating at the same time that the engine stops reciprocating. Accordingly, a brake mechanism may be applied to the flywheel during engine shutdown to arrest rotation of the cutting blade. The braking mechanism of the present invention is also adapted for such an application.

In one aspect of the invention, the engine starting device includes an energy storing mechanism, an input element, and an output element. The energy storing mechanism includes at least one elastic member. The input element is engageable with the elastic member and movable during engine coast down to load the elastic member to a loaded state (e.g., by compressing, stretching, or flexing the elastic member). The output element is movable in response to the energy storing mechanism as the elastic member unloads from the loaded state. In this way, the output element moves or rotates the rotatable engine member in a starting direction, thereby driving the engine through initial engine revolutions sufficient for starting.

The engine starting device may also include an input control device for positioning the input element in engagement with the rotatable engine member such that the input element is movable by the rotatable engine member to load the elastic member. In one embodiment, the input element includes a rotatable input member (e.g., a friction roller or gear) movable by the input control device between a first position and a second position. In the first position, the rotatable input member is rotatably engageable with the rotatable engine member. The input member may be adapted to engage different portions of the rotatable engine member including the crankshaft, the flywheel, a ring gear attached to the flywheel, or a starter-type cup interconnected with the crankshaft. When disposed in the second position, the rotatable input member is rotatably disengaged from the rotatable engine member. Further, the engine may be equipped with an engine control device actuable to initiate shutdown of the engine. In this case, the input control device may be operatively connected with the engine control device such that the input control device is actuated to position the input element in engagement with the rotatable engine member whenever the engine control device is actuated.

In one particular embodiment of the invention, the input control device includes a manual actuator (e.g., a push button or deadman bail handle), a control cable, a pivotable housing supporting the input element, and a control cable and lever interconnecting the manual actuator with the pivotable housing. The input control device may also be interconnected with an ignition system grounding or shut-off switch. Upon actuation of the manual actuator, the pivotable housing is pivoted toward the rotatable engine member such that the input element rotatably engages a portion of the rotatable engine member (e.g., the flywheel or a ring gear attached to the flywheel).

The energy storing mechanism may also include a drive member engageable with the elastic member. The drive member is movable in a first direction by the input element to load the elastic member and movable by the elastic member in a second direction, as the elastic member unloads from the loaded state, to move the output element. Preferably, the drive member is a rotatable member such as a shaft, a rotatable housing, or an annular member rotatably mounted about a shaft. In one embodiment, the drive member includes a rotatable shaft portion or hub having a rotational axis and the output element is mounted for rotation about the rotational axis. In another embodiment, the drive member and the elastic member are spaced axially from the crankshaft and the flywheel, whereby the rotational axis of the drive member is disposed substantially coincidental with a rotational axis of the flywheel or crankshaft.

The engine starting device may also include unidirectional transmission means (e.g., a clutch assembly or a combination helix shaft and axially-movable pinion gear) for rotatably engaging the output element with the rotatable engine member. When the drive member rotates in the second direction, the transmission means allows for the output element to be driven and to rotate the rotatable engine member in the starting direction. However, when the drive member rotates in the first direction, the output element and the rotatable engine assembly are rotatably disengaged.

In one particular embodiment of the invention, the engine includes a recoil starter having a recoil spring, a recoil pulley operatively connected with the recoil spring, and a central driving element (e.g., a starter hub) rotatable in a driving direction by the recoil pulley to drive the rotatable engine member in the starting direction. A drive member of the engine starting device is mounted about the central driving element and rotatable by the elastic member to drive the central driving element in the driving direction.

The elastic member may include at least one windable spring disposed about and/or interconnected with a drive member. In alternative embodiments, the elastic member can have different configurations (e.g., a compressible spring) or may be formed from other elastic materials (e.g., rubber or synthetic material). In one embodiment, the energy storing mechanism includes a housing mounted for rotation (e.g., about the crankshaft or a drive shaft of a recoil starter) and the elastic member is substantially disposed within the housing. One portion of the elastic member is interconnected with the housing while another portion is interconnected with the support member (i.e., a stationary flange).

In one particular embodiment of the invention, the engine starting device includes a rotatable input element, a rotatable output element, a manually releasable locking mechanism, an input control device, and an energy storing mechanism having an elastic member. The energy storing mechanism also has a rotatable drive member that is interconnected with the elastic member. The drive member is rotatable in a first direction to wind the elastic member to a loaded state and rotatable in a second direction by the elastic member as the elastic member unwinds from the loaded state. The rotatable input element is provided to engage with the drive member and to rotate the drive member in the first direction. The input control device is operable to position the input element in rotational engagement with the rotatable engine member during engine coast down such that the drive member is rotatable by the input element in the first direction. Further, the rotatable output element is rotatable in at least one output direction by the drive member when the drive member is rotated in the second direction. Rotation of the output element in the output direction results in the rotatable engine member being rotated in the starting direction.

Finally, the manually releasable locking mechanism is engageable with the energy storing mechanism to prevent the elastic member from unloading from the loaded state and rotating the output element. The locking mechanism may include a manual actuator remotely disposed from the engine and operable to release the locking mechanism and to initiate unloading of the elastic member from the loaded state. In one form of the invention, the locking mechanism includes a pawl member and a movable member (e.g., a ratchet wheel) interconnected with the energy storing mechanism. The movable member is equipped with a ratchet surface and the pawl member is adapted to engage the ratchet surface and to restrain movement of the movable member. A manually-operable key device may be provided for locking the pawl member in an engaged position with respect to the movable member.

A braking mechanism according to the invention generally includes an energy absorbing mechanism, an input element, and an input control device. The energy absorbing mechanism includes at least one elastic member and the input element is engageable with the elastic member and movable to load the elastic member to a loaded state. The input control device is actuable to position the input element into engagement with the rotatable engine member such that rotation of the rotatable engine member moves the input element to load the elastic member.

A manually operated machine according to the invention generally includes an internal combustion engine having a rotatable engine member, a manually actuable engine control device for initiating shutdown of the engine (e.g., by operating a bail handle, push button, or safety stop switch for the ignition system), and an engine starting device. The engine starting device includes an energy storing mechanism having at least one elastic member, an input element that is movable to load the elastic member to a loaded state, and an output element movable in response to the energy storing mechanism as the elastic member unloads from its loaded state. Also provided is an input control device for positioning the input element into engagement with the rotatable engine member. When the engine control device is actuated to initiate shutdown of the engine, the input element is then movable to load the elastic member.

Another feature of the invention is a means for preventing the input element from further loading the elastic member after the elastic member is loaded past a predetermined loaded state. If the elastic member includes a windable spring or band, the preventing means functions to prevent overwinding of the spring or band. In one form, the preventing means includes a slip clutch assembly operatively positioned between the input element and the elastic member. In another form, the preventing means includes a frictional brake engageable with the drive member or another component of the energy storing mechanism or energy absorbing mechanism.

Another feature and an advantage of the present invention is to provide an engine starting device that is simple in construction and easy to operate.

Yet another feature and advantage of the present invention is to provide an engine starting device that is lightweight and does not add considerable cost to the overall cost of the engine.

Yet another feature and advantage of the present invention is an engine starting device that is particularly adapted for retrofitting onto an existing small internal combustion engine.

BRIEF DESCRIPTION OF THE DRAWINGS

FIG. 1 is a perspective view of a lawnmowing machine embodying the invention and incorporating an internal combustion engine and an engine starting device, according to the present invention.

FIG. 2 is a perspective view of an engine starting device according to the present invention.

FIG. 3A is an exploded view of portions of the engine starting device.

FIG. 3B is an exploded view of additional portions of the engine starting device including a power spring and a spring casing.

FIG. 3C is an alternate perspective view of portions of the engine starting device in FIG. 3A, including a spur gear.

FIG. 3D is an exploded view of an assembly of the engine starting device in FIG. 3B including a spring shaft.

FIG. 4 is a side cross-sectional view of the engine starting device.

FIG. 5 is a magnified view of a portion of the engine starting device in FIG. 4.

FIG. 6 is a top cross-sectional view through line 6—6 of FIG. 5.

FIG. 7 is a bottom cross-sectional view through line 7—7 of FIG. 5.

FIG. 8 is a top cross-sectional view through line 8—8 of FIG. 4.

FIG. 9 is a partial top cross-sectional view through line 9—9 of FIG. 4.

FIG. 10 is a partial vertical cross-sectional view of the engine starting device through line 10—10 of FIG. 9.

DETAILED DESCRIPTION OF THE DRAWINGS

Figure 11:
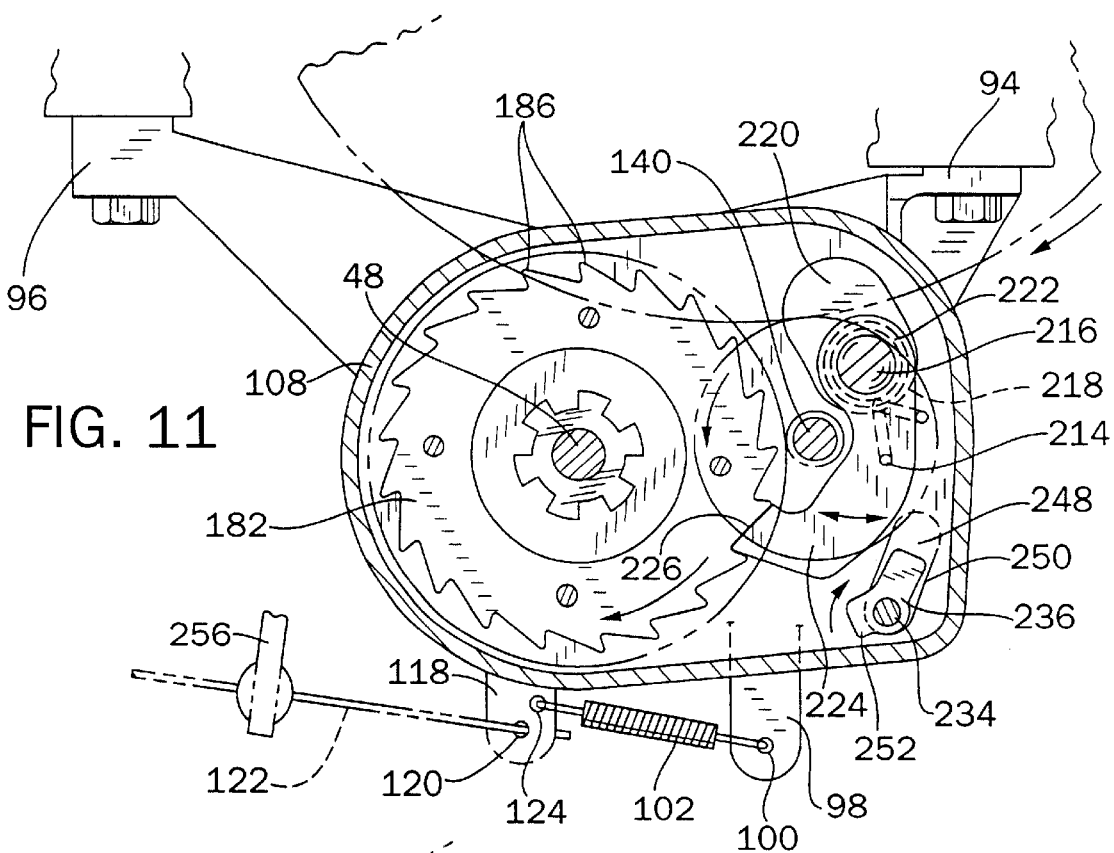
FIG. 11 is a top cross-sectional view of the engine starting device in the winding position.

FIG. 1 depicts a lawnmowing machine or lawnmower 10 incorporating an internal combustion engine 12 and a device 14 for automatically starting the engine 12. Each of the lawnmower 10, the internal combustion engine 12, and the engine starting device 14 includes an embodiment of the present invention.

The lawnmower 10 has a deck 16 and a handle assembly 18 extending outwardly and upwardly from the deck 16. The handle assembly 18 has a lower end 20 that is mounted to the deck 16 and an upper or handle end 22 positioned above the deck 16 at a location which facilitates handling of the lawnmower 10 by an operator. The operator may control movement of the lawnmower 10 by manipulating the handle assembly 18. The internal combustion engine 12 is mounted on the deck 16. The engine 12 is of the vertical shaft type and includes many components which are of conventional construction. Most of these engine components, however, are substantially enclosed by an engine housing 24 and, thus, not shown in FIG. 1.

In addition to the engine starting device 14, the lawnmower 10 in FIG. 1 is equipped with a recoil starter (not shown) that is mounted above a flywheel 26 (see flywheel 26 in FIG. 2). A shroud 28 is mounted over the recoil starter and a pull cord 30 operatively connected to the recoil starter extends outwardly through the shroud 28. When the pull cord 30 is not used, a handle end 32 of the pull cord 30 is rested on a cord mount 34 located near the upper end 22 of the handle assembly 18.

It should first be noted that although the engine starting device 14 embodying the invention is particularly adapted for use with a lawnmower 10, the engine starting device 14 may also be incorporated with various other manually operable outdoor power equipment and machinery, including, but not limited to, hand held lawn and garden machinery, snow blowers, and generators. Accordingly, the present invention is not limited to the lawnmower 10 or the engine 12 depicted in the drawings and described herein. For one having ordinary skill in the art, it will become apparent from the drawings and the description how the engine starting device 14 may be adapted for use with various types of machinery and/or various types of engines.

Referring again to FIG. 1, an engine control device in the form of an elongated deadman handle or bail handle 36 is interconnected with the upper end 22 of the handle assembly 18. The bail handle 36 is pivotally supported about two pivot pins 38 located on the handle assembly 18 and is biased for rotation in a direction away from the upper end 22. When the upper end 22 of the handle assembly 18 and the bail handle 36 are gripped together by the operator, the bail handle 36 is pivoted downwardly about the two pivot pins 38 and can then be held in a starting or run position adjacent the upper end 22. Upon release of the bail handle 36, the bail handle 36 automatically rotates toward a shutdown position as shown in FIG. 1. As is known in the prior art, release of the bail handle 36 will initiate shutdown of the engine 12 by disabling ignition to the engine and/or the activation of a brake.

A manual actuator in the form of a push button 40 is mounted to the handle assembly 18 at a location preferably adjacent one of the pivot pins 38 for the bail handle 36. The push button 40 is operatively interconnected with the bail handle 36. As will be explained below, the operator may actuate the engine starting device 14 to start the engine 12 by depressing the push button 40 and, while the push button 40 is depressed, pivoting the bail handle 36 downward to the starting position. Thus, the engine starting device 14 may be operated only upon the operator employing two separate motions, i.e., depressing (and holding) the push button 40, and pivoting the bail handle 36 downward. In alternative embodiments, the bail handle 36 may be replaced by one or more push button devices, lever mechanisms, or other types of manual actuator. Such modifications will become apparent to one skilled in the art to whom the detail description and drawings provided herein are disclosed.

FIG. 2 depicts a close-up view of the engine starting device 14 mounted on the engine housing 24 and positioned adjacent a set of outer teeth 42 of a ring gear 44. The ring gear 44 is part of the flywheel 26 and both components are rotatably mounted on a crankshaft (not shown) of the engine 12. When the flywheel 26 is rotated in the clockwise direction, the flywheel 26 rotates the crankshaft in the starting or running direction and drives the engine 12 through initial engine revolutions. As the engine 12 starts, it begins to turn under its own power and can then drive rotation of the crankshaft and the flywheel 26.

For purposes of description, the crankshaft and flywheel 26 may be referred to as a rotatable engine member or assembly that rotates together under engine running conditions. The rotatable engine assembly is also rotatable in the starting direction to drive the engine through initial starting revolutions. In alternative applications of the invention, the rotatable engine assembly may also include one or more output devices (e.g., a lawnmower cutting blade).

Shutdown of the engine 12 is initiated upon release of the bail handle 36. However, even after engine shutdown, there is sufficient angular momentum in the rotating engine member comprising the crankshaft, flywheel 26 and other output devices (e.g., lawnmower cutting blade) to continue to drive rotation of the crankshaft and flywheel 26 through additional revolutions. The condition characterized by such additional rotation of the crankshaft and the flywheel 26 after the bail handle 36 is released (i.e., after shutting off of the engine ignition) is commonly referred to as engine coast down. It is known in the prior art to use a flywheel brake device to directly engage the flywheel 26 during engine coast down and to quickly bring rotation of the crankshaft, the flywheel 26, and any output device to a halt. In one aspect of the present invention, the engine starting device 14 is employed as a braking mechanism and, in functioning as such, absorbs and stores energy embodied in the rotating crankshaft and flywheel 26 during engine coast down. In alternative embodiments, the lawnmower 10 or other machinery is equipped with both an engine starting device 14 embodying the invention as well as a conventional flywheel brake. In these applications, the engine starting device 14 is used to assist the flywheel brake in quickly terminating engine coast down.

Referring now to FIGS. 2–4, the engine starting device 14 is equipped with a spring casing 46, a spring drive member or spring shaft 48 supported vertically and centrally through the spring casing 46, and an elastic member in the form of a coiled metallic band or power spring 50 engageable with the spring drive shaft 48 (see FIG. 4). A vertical central axis 52 extends longitudinally through the spring shaft 48 and is positioned in generally parallel relation with the crankshaft (see e.g., FIG. 3B). The spring shaft 48 extends upwardly from the spring casing 46 and through a pivotable housing 54 that is supported above the spring casing 46 (see FIG. 2).

As will be explained below, the pivotable housing 54 is pivotally supported for rocking motion about the central axis 52. The pivotable housing 54 retains a rotatable shaft assembly or input assembly 56 (see FIG. 3D) that is engageable with the flywheel 26 during engine coast down to effect winding of the power spring 50. The pivotable housing 54 also retains a transmission or drive assembly 58 (see also FIG. 3A) that is engageable with the input assembly 56 and operatively positioned between the input assembly 56 and the spring shaft 48. Finally, the pivotable housing 54 retains a rotatable output assembly 60 (see FIG. 3A) that is selectively engageable with the ring gear 44 to drive rotation of the flywheel 26 and to initiate starting of the engine 12. Each of these assemblies 56, 58 and 60 and its operation will be discussed in greater detail below.

It should be noted that the engine starting device 14 may be readily adapted to engage the flywheel 26 directly rather than through the ring gear 44.

For example, the rotatable output assembly 60 may be adapted to mesh with the outer surface (e.g., cast integral teeth) of the flywheel 26.

As best shown in FIG. 3B, the spring casing 46 comprises a cylindrical portion 62, a generally flat bottom 64, and a casing top 66, which are joined together by bolts 68 or the like. The flat bottom 64 is formed with two diametrically opposite flat flanges 70 and a central aperture 72 wherein a bearing 74 is situated. The cylindrical portion 62 is formed with two diametrically opposite vertical protrusions 76 that define inwardly facing channels 78. In final assembly, the cylindrical portion 62, the flat bottom 64, and the casing top 66 are joined together by aligning the channels 78 with the flat flanges 70 and bolt holes (not shown) on the casing top 66, and extending the bolts 68 therethrough.

The power spring 50 is preferably in the form of an elongated, relatively wide metallic band of stainless steel or carbon steel construction. In several forms of the invention, the power spring 50 has a width in the range of about one inch to three inches. In one particular embodiment, the power spring 50 is three inches wide and is capable of producing a starting torque sufficient to rotate the engine 12 through seven or eight revolutions. It should be noted, however, that the width, length and/or thickness of the power spring 50 may be made larger or smaller. Moreover, the elastic member may be in several alternative forms, including a compressible spring or a high strength resilient band made of rubber or a synthetic material.

An outer edge or end 80 of the power spring 50 may be folded into one of the channels 78, as shown in FIG. 3B (see also FIG. 8). The outer end 80 is then fixedly secured by the bolt 68, and/or between the bolt 68 and the vertical protrusion 76.

Referring to FIG. 3B, the power spring 50 has an inside end or edge 82 that is generally positioned near the center of the spring casing 46 and adjacent the spring shaft 48 (see also FIG. 8). A broad arbor portion 84 of the spring shaft 48 is positioned centrally and vertically within the spring casing 46, and is rotatably supported by the bearing 74 and a flange bearing 86. An upper portion 88 of the spring shaft 48 is formed narrower than the lower arbor portion 84 and extends upwardly through the pivotable housing 54. In the embodiment depicted in the Figures, the upper portion 88 of the spring shaft 48 has a diameter preferably about 0.390 inches while the lower arbor portion 84 has a diameter preferably about 0.620 inches. As best shown in the top cross-sectional view of FIG. 8, a portion of the diameter of the lower arbor portion 84 is cut out to form a vertically extending eyelet 90, and the inside end 82 of the power spring 50 is formed into a full loop which can then be engaged or hooked by the eyelet 90.

Applicants have found through extensive testing that the "eyelet" type of spring to spring shaft connection provides most favorable results. The "eyelet" type of connection allows the spring 50 to unhook from the spring shaft 48 once the power spring 50 has completely unloaded and allows the spring shaft 48 to continue to rotate without damage to the power spring 50. In particular, the stresses and stress concentrations effected on the power spring 50 during winding and unwinding is minimized. As a result, the embodiment shown in the Figures has been found to successfully operate through thousands of cycles (engine starts) without failure.

Referring again to FIG. 3B, the casing top 66 of the spring casing 46 includes a deck surface 92 and two mounting brackets 94 and 96 which extend generally outwardly from the deck surface 92. The first mounting bracket 94 is positioned adjacent a starter mount (not shown) on the engine housing 24, while the second mounting bracket 96 extends in a generally opposite direction and is also secured to the engine housing 24. The mounting brackets 94 and 96 support both the spring casing 46 and the pivotable housing 54 adjacent the engine housing 24 and adjacent the outer teeth 42 of the ring gear 44. Further, the casing top 66 has a forwardly extending stationary arm 98 equipped with a small eyelet 100. As will be explained below, the pivotable housing 54 is biased via a return spring 102 fastened to the eyelet 100.

Referring to FIG. 3B, the deck surface 92 of the casing top 66 includes a circular post 104 having a vertical bore 106 that is positioned in co-axial alignment with the central axis 52. A lower pivot bracket 108 of the pivotable housing 54 is positioned above the circular post 104 and has a bottom opening 110 that is axially aligned with the vertical bore 106. Then, the flange bearing 86 is mounted concentrically about the spring shaft 48 and extends upwardly through the vertical bore 106 and the bottom opening 110 (see FIGS. 3D and 4). The spring shaft 48 extends through the flange bearing 86 and into the pivotable housing 54, and is spaced from the inside surface of the flange bearing 86. The spring shaft 48 is, therefore, freely rotatable within the flange bearing 86.

Referring to FIGS. 3A, 3B, and 4, the pivotable housing 54 is formed by adjoining the lower pivot bracket 108 with a corresponding upper pivot bracket 112. As best shown in FIG. 3B, the lower pivot bracket 108 has a generally flat deck 114 whereon the bottom opening 110 is centrally located, and a relatively short and upwardly extending outer perimeter wall 116. A flange or lever arm 118 extends forwardly from the perimeter wall 116 and is equipped with an aperture 120 for connecting a control cable 122, and an aperture 124 into which one end of the return spring 102 is secured.

Now referring to FIG. 3A, the upper pivot bracket 112 includes a downwardly extending outer wall 126, a multi-level top section 128, and a lower flange section 130 extending from a portion of the outer wall 126. The upper pivot bracket 112 also includes an upwardly extending circular hub 132 with a bore or top opening 134 therethrough. The top opening 134 is disposed in coaxial alignment with the bottom opening 110 on the lower pivot bracket 108 and is positioned about the central axis 52. An upper shaft bearing 136 is retained within the top opening 134 such that the upper pivot bracket 112 frictionally engages the outer surface of the upper shaft bearing 136. However, the inside surface of the upper shaft bearing 136 is spaced from the outer surface of the spring shaft 48, such that the spring shaft 48 is freely rotatable within the upper shaft bearing 136. Accordingly, the pivotable housing 54 is supported for rotation or rocking motion about the central axis 52 through free rotation of the lower pivot bracket 108 about the outer surface of the flange bearing 86 and free rotation of the upper shaft bearing 136 about the outer surface of the spring shaft 48. Further, the spring shaft 48 extends through the upper shaft bearing 136 and above the upper pivot bracket 112. A retainer clip 138 is fastened to the spring shaft 48 to retain the pivotable housing 54 to the spring shaft 48.

Referring to the sectional view of FIG. 4, the pivotable housing 54 has a section on the right side wherein the input assembly 56 is disposed, and a section on the left side wherein the output assembly 60 and the transmission assembly 58 are disposed. The input assembly 56 includes an input shaft 140 rotatably supported between the upper pivot bracket 112 and the lower pivot bracket 108 and positioned in generally parallel relation with the spring shaft 48. A friction roller 142 is fixedly mounted to the input shaft 140 for rotation therewith. Referring more specifically to FIG. 3A, the friction roller 142 preferably has a hard metallic core 144 and an outer surface 146 preferably formed of a rubber material. The friction roller 142 is positioned adjacent the outer surface of the flywheel 26 (see FIG. 2) and, as will be explained below, can be moved or rocked laterally with the pivotable housing 54 to rotatably engage the flywheel 26.

The input assembly 56 also includes an input gear 148 mounted on the input shaft 140 below the friction roller 142. The input gear 148 is generally aligned with and engages a spur gear or clutch gear 150 of the transmission assembly 58. When the flywheel 26 rotates the input shaft 140 through rotational engagement with the friction roller 142, the input gear 148 rotatably drives the clutch gear 150.

The clutch gear 150 is mounted around the spring shaft 48 at an axial position above the flange bearing 86 (see e.g., FIGS. 4 and 5). As best shown in FIGS. 3A and 3C, the clutch gear 150 is formed with an upper circular recess 152, a lower circular recess 154, and four evenly spaced rivet holes 156 located radially outward from the circular recesses 152, 154. A circular upper clutch plate 158 is positioned within the upper recess 152 and a lower clutch plate 160 is positioned within the lower recess 154. The upper clutch plate 158 has a central opening 162 that is characterized by a circular outline (i.e., a "bowtie") indented by two upwardly extending curved walls or cams 164 (see also FIG. 6). The two curved cams 164 are spaced across from one another inside the central opening 162 and have sidewall surfaces 166 that form cam surfaces or engagement surfaces of the upper clutch plate 158. Similarly, the lower clutch plate 160 has a central opening 168, but the central opening 168 has a flat star-shaped outline that forms a plurality of internal engagement teeth 170.

In alternative embodiments, the central openings 162, 168 may be characterized by different outlines defining different engagement surfaces or teeth configurations. The design of these configurations is partly determined by the unit loads transferred to the clutch plates 158 and 160 and the material strengths. In the embodiment shown in FIGS. 3A and 3C, the central opening 168 is designed to provide a greater engagement surface (and more engagement teeth 170) to further distribute the load and to minimize the stresses effected on the lower clutch plate 160.

Referring specifically to FIG. 3C, the lower recess 154 is formed with a center hub 172 and a pair of recessed keyways 174 which extend radially outward from diametrically opposed locations. The lower clutch plate 160 is positioned within the lower recess 154 and is located concentrically about the center hub 172. Between the lower clutch plate 160 and the clutch gear 150, a belleville washer 176 and a wear plate 178 are also disposed within the lower recess 154 (see FIG. 3A). Two outwardly extending flanges or keys 180 on the wear plate 178 are received by the recessed keyways 174 and prevent the wear plate 178 from rotating. The wear plate 178 also distributes the load from the belleville washer 176 to the lower clutch plate 160. In alternative embodiments, a wave washer or another type of spring washer may be used in lieu of the belleville washer 176.

Referring now to FIGS. 3A and 5, the transmission assembly 58 further includes a ratchet wheel 182 disposed below the clutch gear 150. The ratchet wheel 182 has a central opening 184 and outer ratchet teeth 186. As shown in FIG. 5, the ratchet wheel 182 is concentrically located about the flange bearing 86, and the outer ratchet teeth 186 extend outward just below the outer perimeter of the clutch gear 150. Furthermore, a generally flat disc 188 having a set of rivet holes 190 and a central opening 192 is positioned within the upper circular recess 152 above the upper clutch plate 158. Shoulder rivets 194 are extended through the holes 190, the clutch gear 150, and the ratchet wheel 182 and locked to secure the components of the transmission assembly 58. Accordingly, the transmission assembly 58 comprises the following components: the disc 188; the clutch gear 150; the wear plate 178; the belleville washer 176; the ratchet wheel 182; and the upper and lower clutch plates 158, 160. These transmission assembly components normally rotate together as a unit upon rotational engagement between the clutch gear 150 and the input gear 148. In alternative embodiments, the transmission assembly 58 may be secured by using bolts, screws or similar conventional securing means.

Now referring to FIGS. 3D and 7 as well as FIG. 5, a driving clutch element 196 is fixedly mounted on the spring shaft 48 at a location directly above the flange bearing 86. As depicted in the top view of FIG. 7, the clutch element 196 has a star-shaped form which corresponds with the star-shaped outline of the central opening 168 of the lower clutch plate 160 and is rotatably engageable with the engagement teeth 170 of the lower clutch plate 160. When the clutch gear 150 is rotated in the clockwise direction by the input gear 148, the lower clutch plate 160 drives the clutch element 196 to rotatably drive the spring shaft 48 in a clockwise direction, thereby winding the power spring 50. As the power spring 50 is wound through a predetermined number of revolutions, increased resistance effected by the power spring 50 causes the engagement between the lower clutch plate 160 and the clutch gear 150 to slip and the transmission assembly 58 to become disengaged from the spring shaft 48. As a result, rotation of the spring shaft 48 stops and the power spring 50 is prevented from overwinding.

Now referring to FIGS. 3A and 4, the output assembly 60 includes a helix shaft 198 mounted on the spring shaft 48 between the upper recess 152 of the clutch gear 150 and the upper pivot bracket 112. The helix shaft 198 is formed with a spiral groove or track 200 that extends axially upward in the clockwise direction and terminates at a shaft head 202 positioned adjacent the bottom surface of the upper pivot bracket 112. The cams 164 of the upper clutch plate 158 extend upwardly and engage a bottom portion 204 of the helix shaft 198 (see FIG. 5). As best shown in FIG. 6, the bottom portion 204 has a form or configuration that corresponds with the outline of the central opening 162 of the upper clutch plate 158 and is, therefore, positively engageable with the cam surfaces 166 of the upper clutch plate 158.

The output assembly 60 further includes a pinion gear 206 positioned above the disc 188 and mounted for axial and rotational movement about the helix shaft 198. The pinion gear 206 has a set of outer teeth 208 and a raised central hub 210 with a central opening (see FIG. 3A). The inside surface of the central opening is defined by a spiral groove or track 212 that corresponds with and is engageable with the track 200 of the helix shaft 198. Accordingly, when the helix shaft 198 rotates in the counterclockwise direction with the spring shaft 48, the pinion gear 206 rotates axially upward about the helix shaft 198.

When the pinion gear 206 reaches the shaft head 202, axial travel of the pinion gear 206 stops and the helix shaft 198 preferably drives the pinion gear 206 in the same rotational plane as the ring gear 44. The outer teeth 208 of the pinion gear 206 then mesh with the outer teeth 42 of the ring gear 44 and rotatably drive the ring gear 44 and the flywheel 26 in the clockwise or starting direction. At this stage of operation, the pinion gear 206 is referred to as being in the top or engaged position (as shown in dash lines in FIG. 4). However, as the engine 12 picks up starting speed, the outer teeth 42 of the ring gear 44 overrun and then drive the outer teeth 208 of the pinion gear 206, thereby spinning the pinion gear 206 axially downward about the helix shaft 198. The pinion gear 206 is then returned to a bottom or disengaged position above the transmission assembly 58 (as shown by solid lines in FIG. 4).

Although the helix shaft 198 is mounted for rotation with the spring shaft 48, frictional engagement between the upper clutch plate 158 and the bottom portion 204 of the helix shaft 198 allows the helix shaft 198 to slip relative to the spring shaft 48 when the helix shaft 198 rotatably drives the pinion gear 206 into initial engagement with the ring gear 44. However, after initial engine rotation (wherein high loads are encountered by the output assembly 60), the frictional engagement between the upper clutch plate 158 and the helix shaft 198 ensures that the helix shaft 198 does not slip. Thus, the engine 12 continues to rotate and the pinion gear 206 drives the ring gear 44 through starting.

It should also be noted that the spiral track 200 of the helix shaft 198 prevents the pinion gear 206 from travelling axially upward about the helix shaft 198 when the spring shaft 48 rotates in the clockwise direction (i.e., when the power spring 50 is being wound or loaded). Thus, the output assembly 60 is operable to rotatably drive the ring gear 44 only when the spring shaft 48 is rotated in the counterclockwise direction.

FIGS. 1–19 illustrate a first embodiment of a spring locking mechanism according to the invention. The spring locking mechanism may be actuated to prevent the power spring 50 from unwinding and rotating the spring shaft 48.

Further, a manually-operable key device may be actuated to lock the spring locking mechanism in the engaged position, to prevent inadvertent release and unwinding of the power spring 50. There are two versions of the key device, as described below.

Referring first to FIG. 3B, the spring locking mechanism of the first embodiment includes a pawl 214 mounted for limited rotation about a stationary screw 216 and secured between the screw 216 and a torsional spring 218. The torsional spring 218 is also concentrically mounted about the screw 216, and the screw 216 secures both the torsional spring 218 and the pawl 214 to the stationary deck surface 92 of the casing top 66. An elongated slot 220 provided on the lower pivot bracket 108 is configured to allow the screw 216 to extend downwardly to the deck surface 92, but to allow the pawl 214 to be located above the lower pivot bracket 108. As will be described below, the slot 220 is also shaped to allow the pivotable housing 54 to pivot or rock without the screw 216 hindering its travel.

The pawl 214 has a circular pivot end or first end 222 through which the screw 216 extends and a curved second end 224 that defines a cam surface 226. Further, the torsional spring 218 has a first end 228 that is secured to the deck surface 92 and a second end 230 that engages the pawl 214. The torsional spring 218 functions to bias the pawl 214 in the clockwise direction into engagement with the ratchet wheel 182. In an engaged position of the pawl 214, the cam surface 226 of the pawl 214 engages and locks onto the outer ratchet teeth 186 of the ratchet wheel 182. The plan view of FIG. 11 depicts the pawl 214 disposed in the engaged position.

When the pawl 214 is disposed in the engaged position, the pawl 214 prevents the ratchet wheel 182 from rotating in the counterclockwise direction. The spring shaft 48 is also prevented from rotating in the counterclockwise direction and, in this manner, the power spring 50 is prevented from unwinding and rotatably driving the spring shaft 48. However, because the pawl 214 and outer ratchet teeth 186 are shaped such that the pawl 214 can only engage one side of the outer ratchet teeth 186, the ratchet wheel 182 is not prevented from rotating in the clockwise direction. Accordingly, even when the pawl 214 is in the engaged position, the power spring 50 may be wound upon clockwise rotation of the clutch gear 150.

As mentioned above, there are two versions of the key device. The first version of the key device is illustrated in FIGS. 1–12, and the second version of the key device is illustrated in FIGS. 13–19. The first version of the key device is described below, and then the second version is explained.

The first version of the key device includes a removable key handle 232, a key rod 234, and a rotatable cam 236. The key handle 232 further includes a downwardly extending post 238 (FIG. 10) having a vertical bore or keyway 240 through its bottom surface. The keyway 240 and, thus, the key handle 232, is engageable with a key post 242 that extends upwardly from the key rod 234. Through engagement of the keyway 240 and key post 242, the key rod 234 is rotatable upon rotation of the key handle 232. Moreover, the rotatable cam 236 is rotatable upon rotation of the key handle 232.

As shown in FIG. 10, the key rod 234 is supported in a key support aperture 244 located on a support bracket 246 that extends from the engine housing 24. The key handle post 238 of the key handle 232 is insertable into the key support aperture 244 to engage the key post 242 and to allow for manual operation of the rotatable cam 236. However, the key handle 232 may be removed from the key support aperture 244. When this is done, the key rod 234 and the rotatable cam 236 are rendered manually inoperable.

Referring to FIGS. 9 and 10, an elongated key rod slot 248 is formed on the lower flange section 130 of the upper pivotable bracket 112 so that the key rod 234 can extend into and through the lower pivot bracket 108. The key rod slot 248 is also shaped to allow the pivotable housing 54 to slide past the key rod 234 when the pivotable housing 54 is moved by the control cable 122, as will be described below.

As depicted in FIG. 9, the rotatable cam 236 has an extended cam portion 250 and a back portion 252 offset from the extended cam portion 250. The rotatable cam 236 may be rotated in the counter-clockwise direction such that the extended cam portion 250 engages the second end 224 of the pawl 214 and the back portion 252 frictionally engages the outer wall 116 of the lower pivotable bracket 108. In this position, the rotatable cam 236 prevents the pawl 214 from disengaging the ratchet wheel 182 and the power spring 50 from inadvertently unwinding. FIG. 9 depicts the pawl 214 disposed in the engaged position and the rotatable cam 236 of the key device disposed in the locked position.

Figure 12:
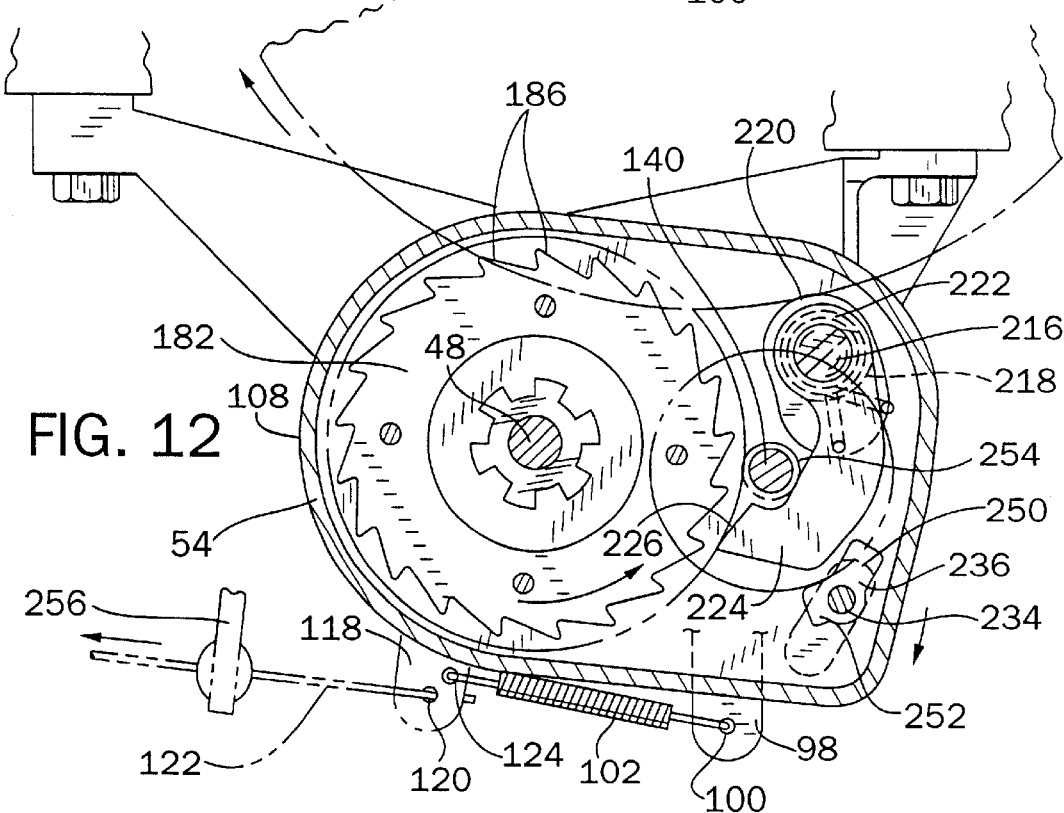
FIG. 12 is a top cross-sectional view of the engine starting device in the unwinding position.

FIG. 11 depicts the rotatable cam 236 rotated clockwise from the locked position to a disengaged or unlocked position. When the rotatable cam 236 is in the disengaged position, it no longer engages the pawl 214. The pawl 214 is, therefore, releasable to disengage from the ratchet wheel 182 and to effect the unwinding of the power spring 50. Further, as illustrated in FIGS. 11 and 12, the pivotable housing 54 is movable in the clockwise direction by pulling the control cable 122. In FIG. 11, the rotatable cam 236 is positioned adjacent the bottom portion of the key rod slot 248 (as shown in the plan view of FIG. 11), but as the pivotable housing 54 is rocked in the clockwise direction, the top portion of the key rod slot 248 moves closer to the rotatable cam 236. The pivotable housing 54 slides past the stationary screw 216 and key rod 234 (as shown in FIG. 12). An upwardly extending boss 254 (FIGS. 3B and 4) is provided in the lower pivot bracket 108, and serves as a lower bearing for the input shaft 140. The boss 254 disengages the pawl 214 from the ratchet wheel 182 as the pivotable housing 54 is rocked in the clockwise direction.

Referring to FIG. 2, a third mounting bracket 256 extends from the engine housing 24 and includes an aperture (not shown) wherein a cable mount 258 is supported. The cable mount 258 supports one end of a cable casing 260 that houses the axially-movable control cable 122 (e.g., a bowden cable). The control cable 122 is interconnected with and movable by the push button device 40 and/or the bail handle 36. The control cable 122 extends from the cable mount 258 and engages the aperture 120 on the lever arm 118. Now referring to FIGS. 9 and 12, the control cable 122 may be moved inwardly or outwardly (by actuating the push button device and/or the bail handle 36) to move the lever arm 118 and to move the pivotable housing 54 in a rocking motion.

Referring to the top views of FIGS. 11 and 12, the return spring 102 interconnects lever arm 118 with the stationary arm 98 and biases the pivotable housing 54 in the counter-clockwise direction. When the bail handle 36 is released to initiate shutdown of the engine 12, the return spring 102 rocks the pivotable housing 54 in the counterclockwise direction and into a position referred to as the winding position.

In the winding position illustrated in FIGS. 9–11, the friction roller 142 rotatably engages the flywheel 26 and is thereby rotated in the counterclockwise direction. As a result, the input gear 148 and input shaft 140 also rotate in the counterclockwise direction and the input gear 148 rotates the clutch gear 150 and the rest of the transmission assembly 58 in the clockwise direction. The transmission assembly 58 then rotates the spring shaft 48 in the clockwise direction which effects winding of the power spring 50. When engine coast down ends, the pawl 214 engages and interlocks the ratchet wheel 182 thereby preventing counterclockwise rotation of the spring shaft 48 and unwinding of the power spring 50.

When the push button 40 is depressed and the bail handle 36 is pivoted downward, the control cable 122 rocks the pivotable housing 54 in the clockwise direction and into a position referred to as the unwinding or starting position, illustrated in FIG. 12. In the unwinding position of the pivotable housing 54, the friction roller 142 is moved away from, and rotatably disengages, the flywheel 26. Continued clockwise motion of the pivotable housing 54 causes the boss 254 to contact and disengage the pawl 214 from the ratchet wheel 182. The power spring 50 can then unwind to rotate the spring shaft 48 and the helix shaft 198 in the counterclockwise direction. In response, the pinion gear 206 moves axially upward about the helix shaft 198 and rotatably engages the ring gear 44 to rotate the ring gear 44 and the flywheel 26 in the clockwise or starting direction. The engine 12 is then driven through initial starting revolutions sufficient to start the engine 12. Finally, when the engine 12 starts and picks up speed, the ring gear 44 spins the pinion gear 206 downward about the helix shaft 198 to its disengaged position.

The second version of the key device, illustrated in FIGS. 13–19, operates in a manner similar to the first version of the key device (i.e., to lock the pawl 214 in engagement with the ratchet wheel 182). This version is particularly applicable to engine applications wherein the key rod 234 cannot be located close to the pawl 214.

Figure 13:
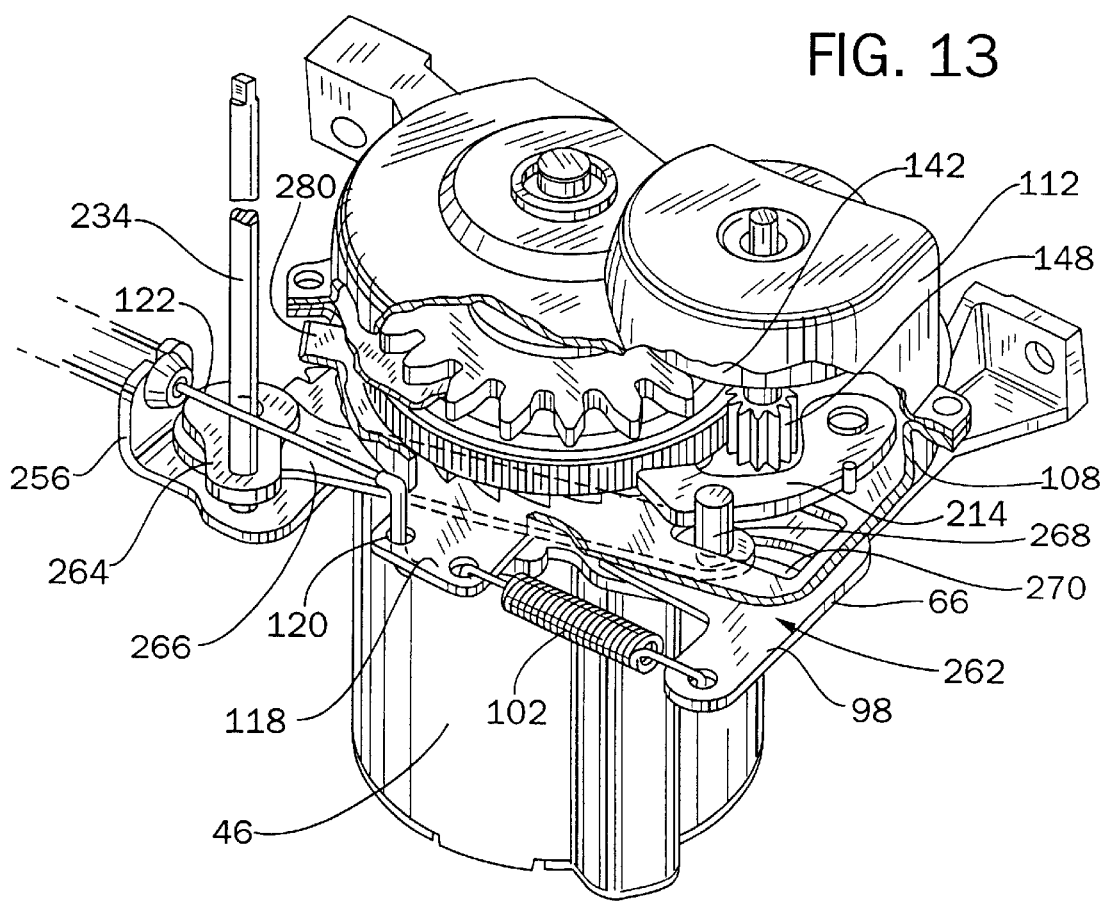
FIG. 13 is a perspective view of an engine starting device that incorporates an engine shut-off system, according to the invention.

The second version of the key device includes several features not present in the first version of the key device. As illustrated in FIG. 13, these additional features include: a stationary support plate 262; a pivot link 264; a sliding member 266; and a cam post 268. The stationary support plate 262 is mounted on the casing top 66 below the lower pivot bracket 108, and, in this version of the key device, provides a pivotal mounting point for the pivot link 264. In this version, the stationary support plate 262 also provides the stationary arm 98 for attachment of the return spring 102.

The pivot link 264 is pivotally mounted on the stationary support plate 262, and is directly operable by the key rod 234. The pivot link 264 is pinned to one end of the sliding member 266. The sliding member extends between the stationary support plate 262 and the lower pivot bracket 108. The cam post 268 is secured to the opposite end of the sliding member 266, and extends downwardly through a guide slot 270 in the stationary support plate 262, and upwardly through a window in the lower pivot bracket 108. Rotation of the pivot link 264 by the key rod 234 causes the sliding member 266 and cam post 268 to move between the positions shown in FIGS. 15 and 17.

Figure 17:
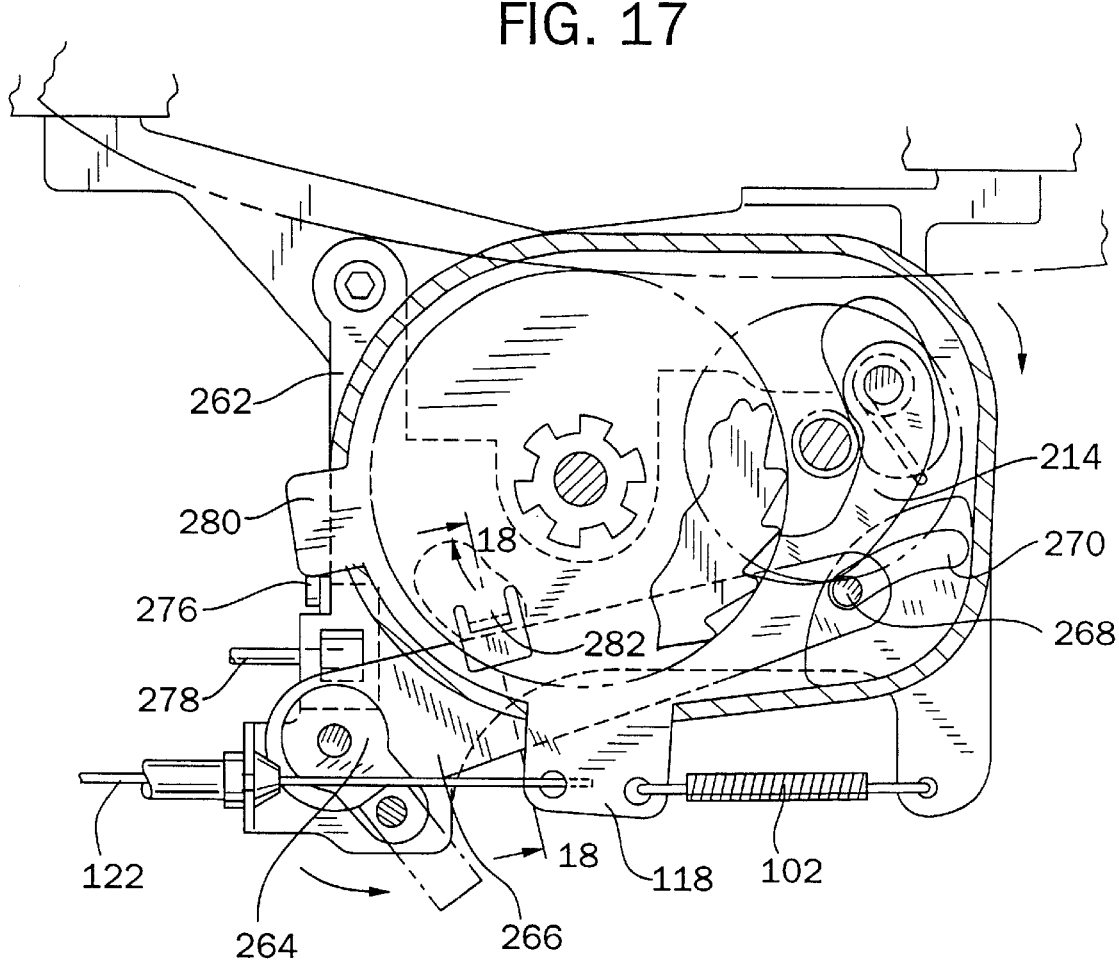
FIG. 17 is a top cross-sectional view of the engine starting device in FIG. 13 with the spring locking mechanism in the locked position.
Figure 18:
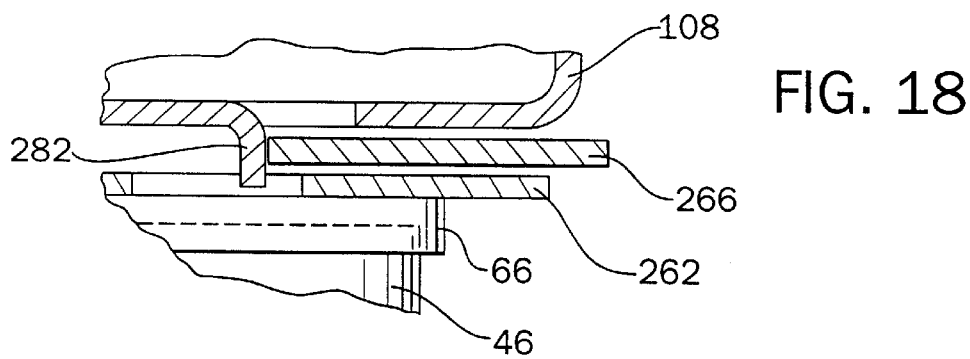
FIG. 18 is a sectional view through line 18—18 in FIG. 17.

FIG. 17 depicts the second version of the key device in the locked position, wherein the pivot link 264 has been rotated in the counterclockwise direction so that the cam post 268 engages the pawl 214. In this position, the cam post 268 prevents the pawl 214 from disengaging from the ratchet wheel 182 and the power spring 50 from unwinding.

Figure 15:
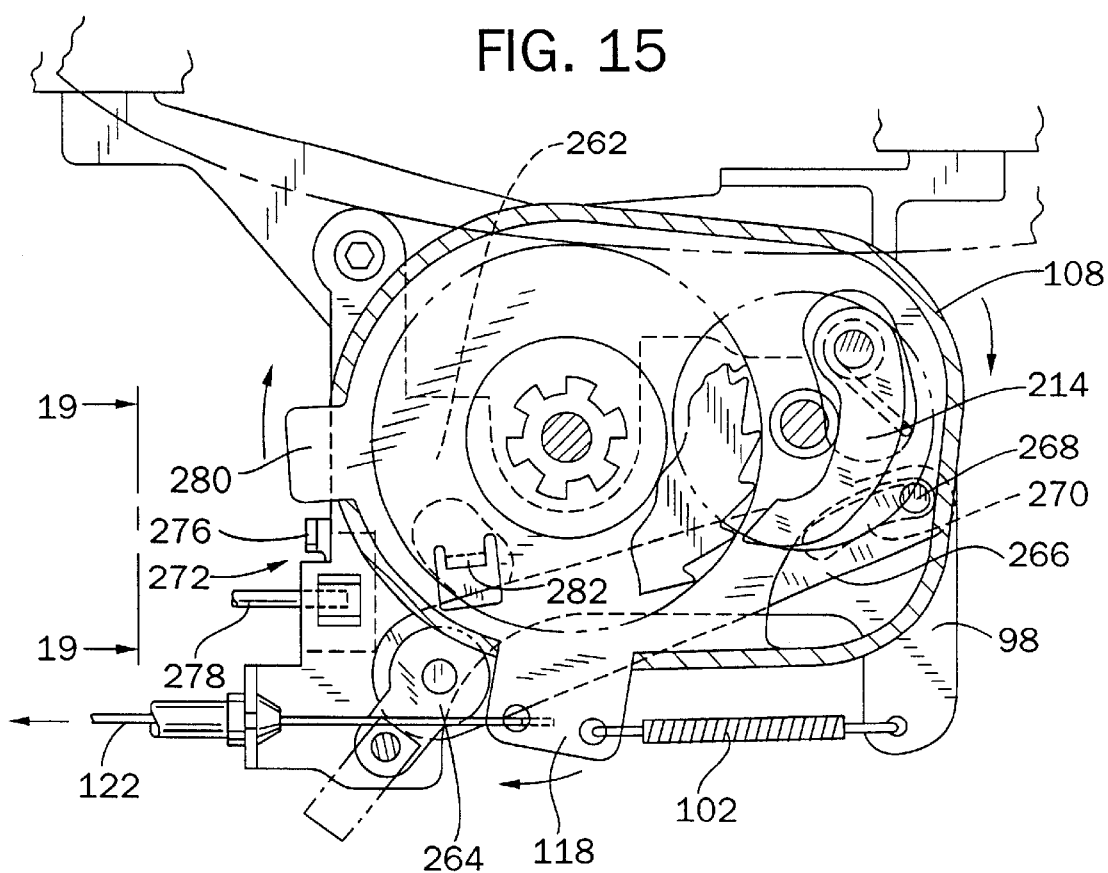
FIG. 15 is a top cross-sectional view of the engine starting device in FIG. 13 with the safety stop switch in an inoperative position and a spring locking mechanism in the disengaged and unlocked position.
Figure 16:
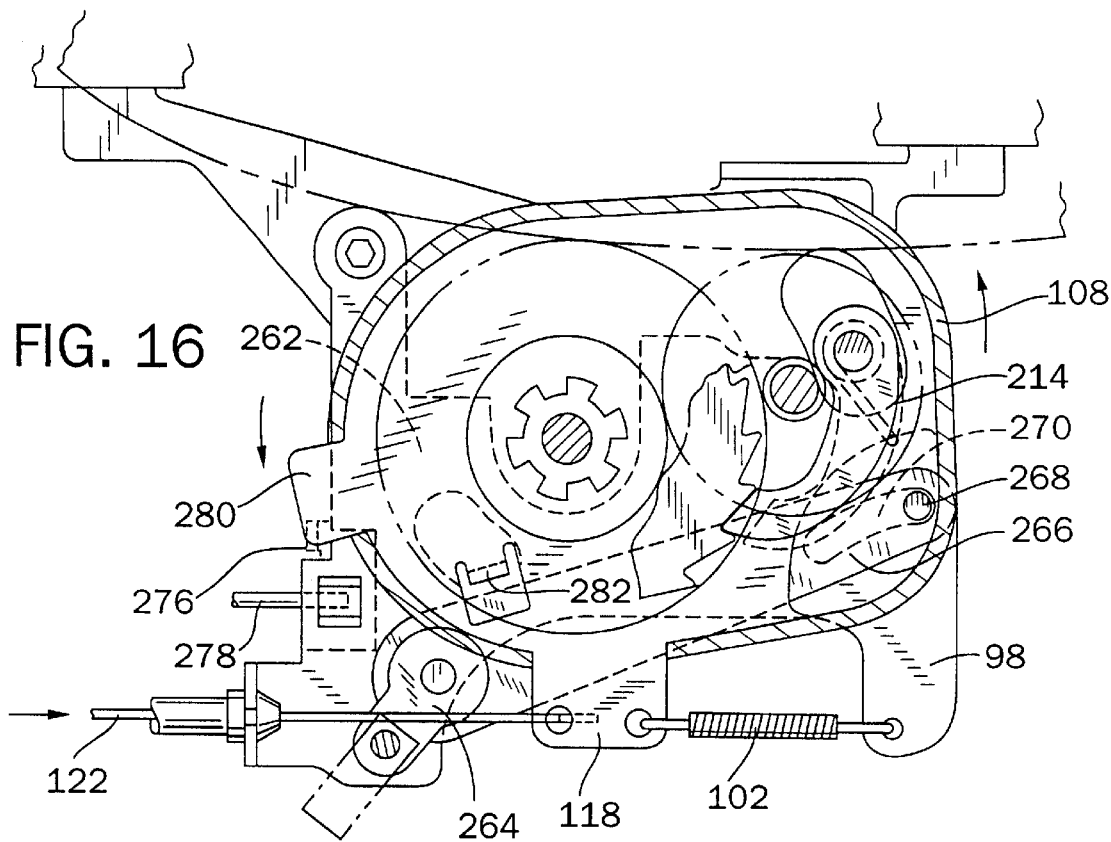
FIG. 16 is a top cross-sectional view of the engine starting device in FIG. 13 with the safety stop switch in the operative position and the spring locking mechanism in the engaged and unlocked position.

FIGS. 15 and 16 depict the second version of the key device in the unlocked position, wherein the key handle 232 and pivot link 264 have been turned in the clockwise direction. As a result, the cam post 268 slides along the guide slot 270 and moves away from the pawl 214. In FIG. 16, the pawl, though unlocked, is still engaged with the ratchet wheel 182. In FIG. 15, the pawl 214 is disengaged from the ratchet wheel 182 by movement of the pivotable housing 54.

Also illustrated in FIGS. 13–19 is an apparatus and a system for shutting off the engine 12 by grounding the ignition system circuit of the engine 12 upon a particular occurrence. Although not illustrated in the other Figures, it is understood that all embodiments of the invention include an engine shut off system. It should also be noted that the lower and upper pivot brackets 108, 112 and other structural components of the engine starting device 14 are preferably formed from a metallic, electrically-conductive material.

Figure 14:
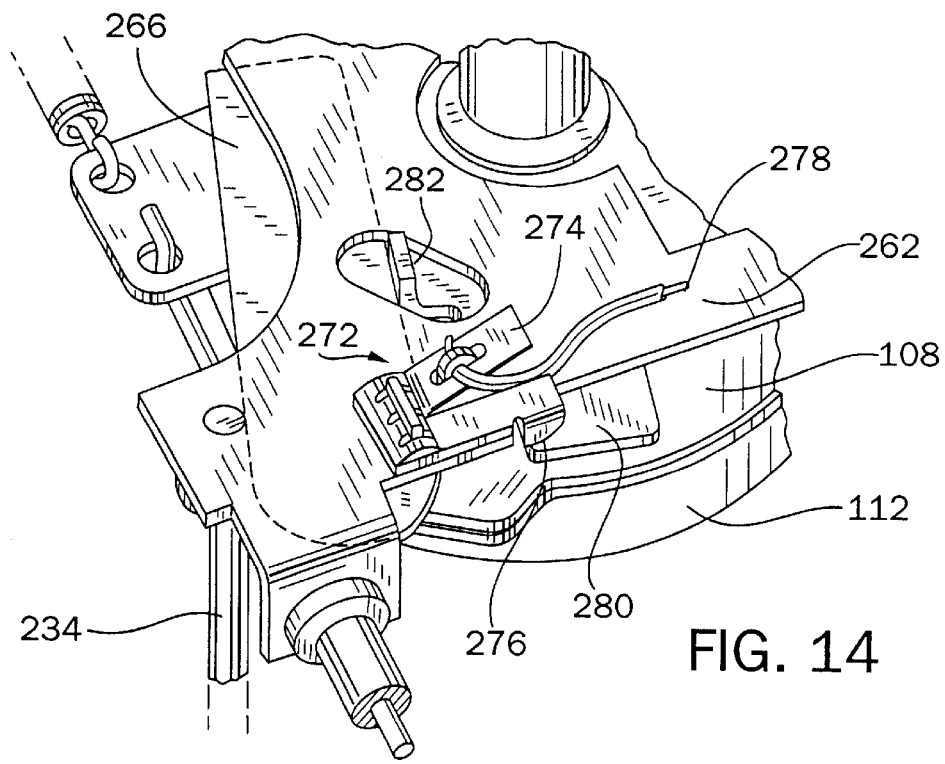
FIG. 14 is a bottom perspective of the engine shut-off system including a safety stop switch.
Figure 19:
FIG. 19 is a side view through line 19—19 in FIG.15.

The illustrated engine shut-off system functions in a manner described in U.S. Pat. Nos. 4,971,001, 5,040,644, and 5,086,890 (all of which are assigned to Briggs and Stratton Corporation and herein incorporated by reference). More specifically, as illustrated in FIGS. 14 and 19, a safety stop switch 272 is fixedly mounted on the bottom surface of the stationary support plate 262. The safety stop switch 272 includes a flexible terminal 274 and a ground contactor 276.

The flexible terminal 274 is electrically connected with a conductor wire 278 leading to the primary winding of the ignition system (not shown). The ground contactor 276 is disposed adjacent the outer periphery of the support plate 262 and extends above the top surface of the support plate 262. A horizontally extending contact tab 280 extends outward from the lower pivot bracket 108 beyond the support plate 262 and is movable with the lower pivot bracket 108.

As illustrated in FIG. 15, when the lower pivotal bracket 108 is rotated to unlock the pawl 214, the ground contactor 276 is separated from the contact tab 280 such that the ignition system is operable. As illustrated in FIG. 16, when the bail handle 36 is released, the lower pivotal bracket 108 is rotated to lock the pawl 214, also causing the contact tab 280 to engage the ground contactor 276 and ground the stop switch 272. In this condition, the ignition system is grounded and the engine 12 cannot run.

Referring to FIGS. 14, 16, and 17, a tab stop 282 is provided on the lower pivot bracket 108, and extends downwardly therefrom. When the second version of the key device is used to move the sliding member 266 from the unlocked position shown in FIGS. 15 and 16 to the locked position shown in FIG. 17, the sliding member 266 engages the tab stop 282 (see also FIG. 18). This action rotates the lower pivot bracket 108 clockwise to rotatably disengage the friction roller 142 from the flywheel 26. The contact tab 280 is wide enough to allow enough rotation of the lower pivot bracket 108 to disengage the friction roller 142 from the flywheel 26, while remaining in contact with the ground contactor 276 to ground the ignition system.

Several versions of the engine shut-off system other than that illustrated may be used. For example, one version may ground the ignition system of the engine upon release of an actuator such as the bail handle 36. Alternatively, the ignition systems and engine shut-off systems described and illustrated in U.S. Pat. Nos. 4,971,001, 5,040,644, and 5,086,890 may be directly incorporated into this invention.

In alternative embodiments to that shown in FIGS. 1–19 and described above, the engine starting device may be equipped with two or more spring casings each retaining a power spring. The power springs may be operated in series to rotate a spring shaft. Also, a plurality of power springs may be retained in a spring casing. More particularly, three one inch wide power springs may be disposed on one another and have inside ends interconnected with, or secured by, the same spring shaft. These three springs would then operate in parallel and produce a starting torque comparable to one three inch power spring.

In one aspect of the invention, the engine starting device 14 may be easily adapted onto an existing internal combustion engine 12. For example, the engine 12 depicted in FIGS. 1–19 was previously equipped with an electric starter mounted adjacent the engine housing 24. The battery, alternator, flywheel brake, wiring, and electric starter were removed, and the engine starting device 14 was inserted and mounted in the same location where the electric starter was previously mounted. Moreover, the pinion gear 206 and helix shaft 198 depicted in the drawings of the engine starting device 14 are identical to those used in the electric starter assembly.

It should also be noted that the input assembly 56 of the engine starting device 14 depicted in FIGS. 1–19 may be readily substituted with alternative forms of an input assembly. For example, a battery and an electric motor having a rotatable drive may be selectively operable to engage the clutch gear 150. Alternatively, such a battery and an electric motor having a rotatable drive may be provided as a backup input device to the input assembly 56.

FIGS. 20–23 depict a second engine starting device embodying the invention and applied to a second internal combustion engine 313 having a vertical crankshaft 315. Certain components of the engine starting device are mounted between a flywheel 317 and an engine housing 319. In particular, a power spring 321 is interconnected with the bottom of the flywheel 317 and utilized to drive the engine 313 through initial starting revolutions. Accordingly, the engine starting device of FIGS. 20–23 may be referred to as an under-the-flywheel version of the engine starting device according to the invention.

Figure 22:
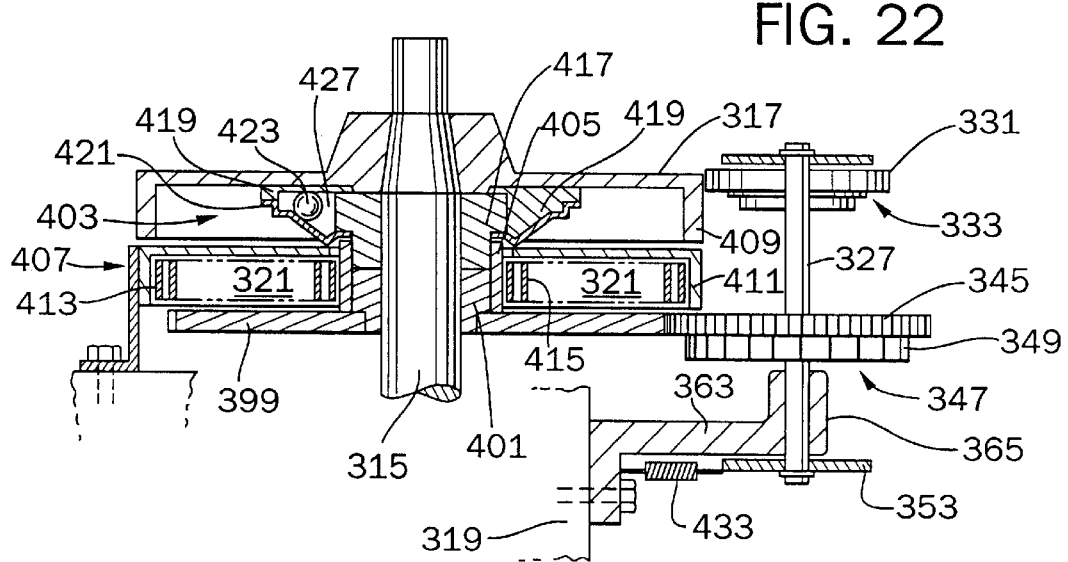
FIG. 22 is a side cross-sectional view through line 22—22 of FIG. 20.
Figure 23:
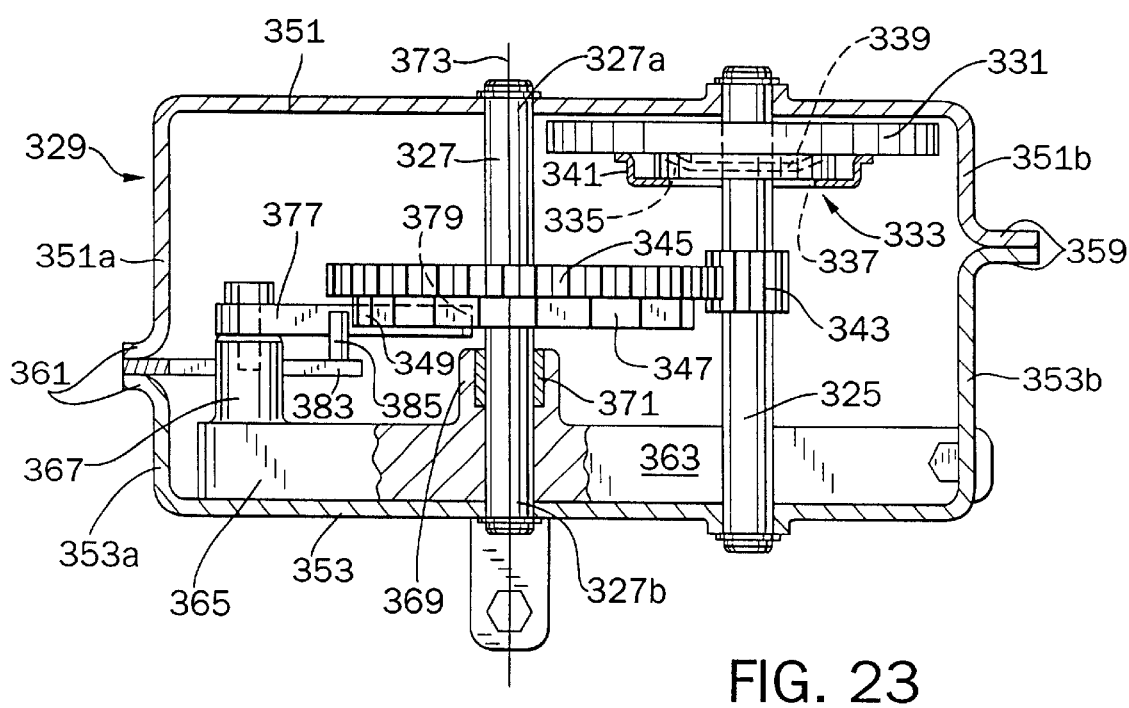
FIG. 23 is a side cross-sectional view through line 23—23 of FIG. 20.

Now referring to FIGS. 22 and 23, the engine starting device has an input means or input assembly 323 that includes a pinion shaft 325 and an idler shaft 327 mounted within a pivotable housing 329. The two shafts 325, 327 are generally positioned to the side of the flywheel 317 and in generally parallel relation with the crankshaft 315. A friction roller 331 is fixedly mounted onto the pinion shaft 325 at a position where it can be moved laterally into rotational engagement with the flywheel 317 (see also FIG. 20).

Further, a torque limiting clutch assembly 333 is mounted below the friction roller 331 and operatively positioned between the pinion shaft 325 and the friction roller 331. The clutch assembly 333 includes a clutch plate 335, a clutch housing 341, a plate 337, a driving element 339, and a compression spring (not shown). The clutch assembly 333 functions in a manner similar to that described above with respect to the transmission assembly 58 of the first embodiment of the engine starting device 14. Upon a predetermined increase in spring resistance, the clutch assembly 333 functions to prevent overwinding of the power spring 321. In one particular embodiment of the invention, the clutch assembly 333 is rated at about fifteen inch-pounds maximum.

A lower pinion gear 343 is fixedly mounted on the pinion shaft 325 below the friction roller 331 and at a generally intermediate position on the pinion shaft 325. The idler shaft 327 is mounted in generally parallel relation to the pinion shaft 325 and carries an idler gear 345 and a ratchet wheel 347 having a set of outer teeth 349. The ratchet wheel is fixedly mounted to the idler shaft 327 below the idler gear 345. The lower pinion gear 343 shares a rotational plane with the idler gear 345 and is rotatably engaged with the idler gear 345 to rotate the idler gear 345 and the idler shaft 327 upon rotational engagement of the friction roller 331 with the flywheel 317.

Figure 20:
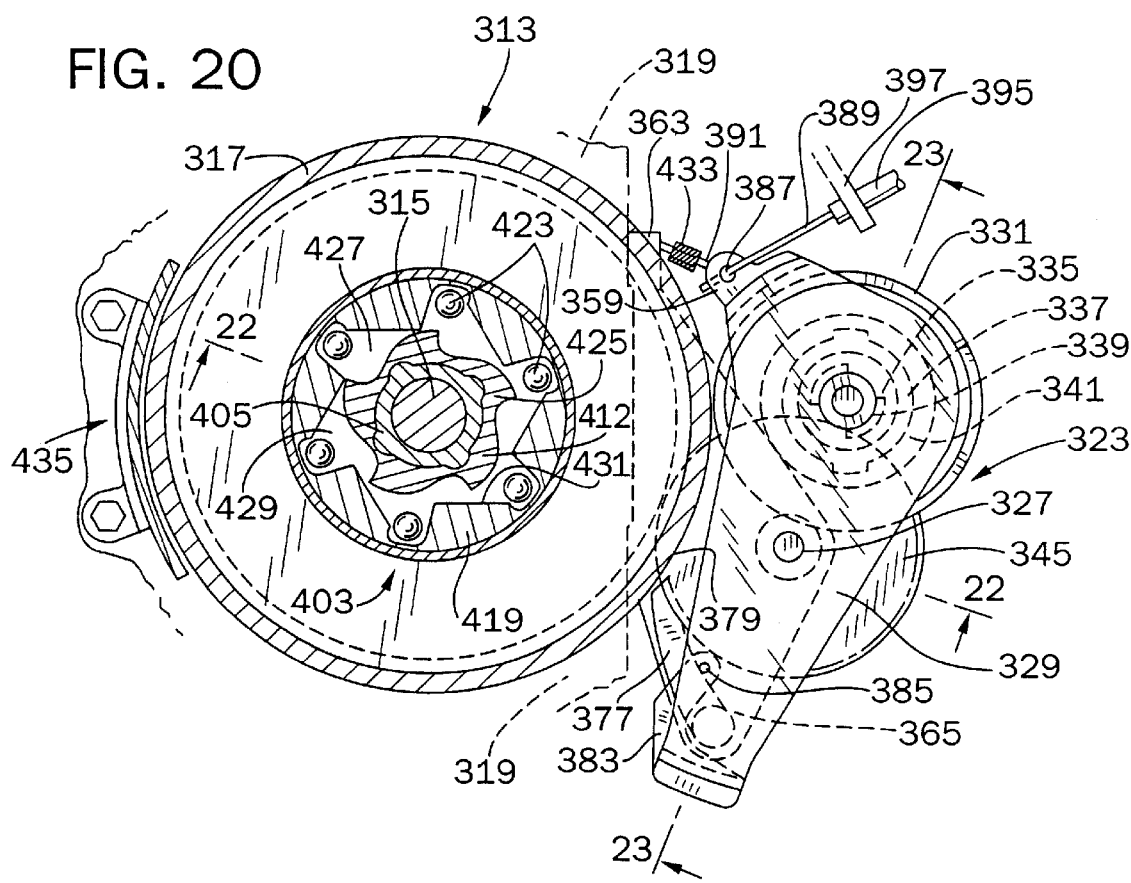
FIG. 20 is a top cross-sectional view of a second embodiment of the invention.

Now referring to FIGS. 20 and 23, the pivotable housing 329 is mounted adjacent the engine housing 319 and is formed by an upper pivot bracket 351 and a lower pivot bracket 353. The upper and lower pivot brackets 351, 353 have left end walls 351*a*, 353*a*, respectively, and right end walls 351*b*, 353*b*, respectively. The right end walls 351*b*, 353*b* are mated and secured together via a pair of right flanges 359 and the left end walls 351*a*, 353*a* are mated and secured together via a pair of matching left flanges 361. As best shown in FIG. 20, the pivotable housing 329 is supported on a mounting plate 363 that is attached to the engine housing 319 and extends therefrom. The mounting plate 363 is a generally flat plate and includes an outer portion 365 that extends between the upper pivot bracket 351 and the lower pivot bracket 353.

Referring specifically to FIG. 23, the outer portion 365 is provided with a first mounting post 367 and a boss or second mounting post 369 formed with a bearing 371. The idler shaft 327 has a top end 327*a* supported on the upper pivot bracket 351, a lower end 327*b* supported on the lower pivot bracket 353. In between, the idler shaft 327 is rotatably supported in the bearing 371. Accordingly, while the idler shaft 327 is rotatable within the bearing 371, the entire pivotable housing 329 is pivotable about a longitudinal axis 373 of the idler shaft 327 through rotational engagement between the idler shaft 327 and the bearing 371.

Referring specifically to FIGS. 20 and 23, the engine starting device is further equipped with a pawl 377 having a cam surface 379 and a torsional spring (not shown) mounted on the first mounting post 367 and engaging the pawl 377. The pawl 377 is biased so that the cam surface 379 engages the outer teeth 349 of the ratchet wheel 347 and prevents the idler shaft 327 from rotating in the counter-clockwise direction. Moreover, a peninsular plate 383 is mounted between the left flanges 361 and extends outwardly therefrom and underneath the pawl 377. A bump pin 385 extends upwardly from the peninsular plate 383 and is engageable with the pawl 377 to disengage the pawl 377 from the ratchet wheel 347.

Figure 21:
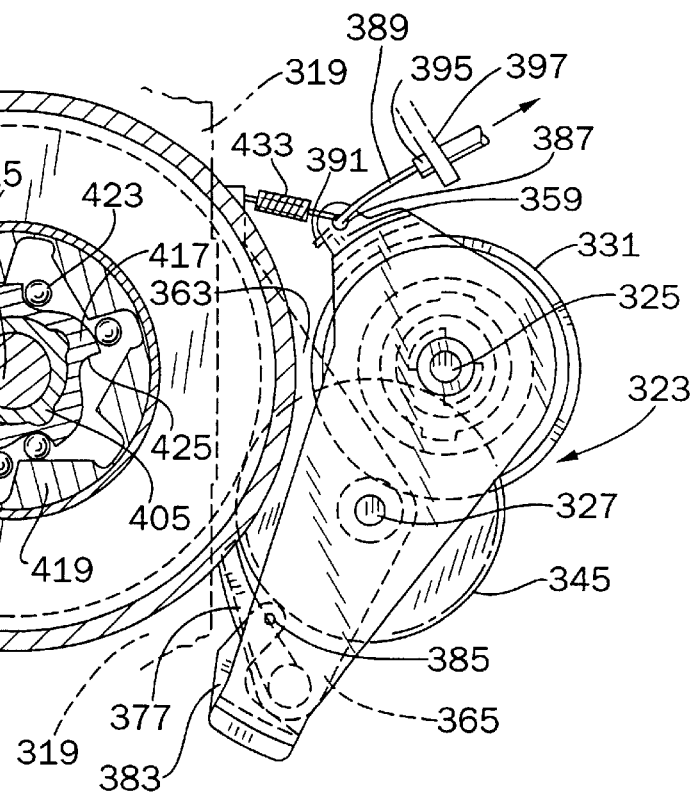
FIG. 21 is a top cross-sectional view of the engine starting device of FIG. 20 in the unwinding position.

Now referring to FIGS. 20 and 21, a bent end 391 of a control cable 389 engages an eyelet 387 formed in the right flanges 359. The control cable 389 is axially movable within a control cable casing 395 that is mountably supported in a cable mount 397. The control cable 389 may be interconnected with a manual control system (not shown) remotely disposed from the engine housing 319 for moving the pivotable housing 329. In several embodiments, the control cable 389 is interconnected with a manual actuator such as a bail handle, lever, or push button remotely located from the engine 313.

The control cable 389 may be operated to rock the pivotable housing 329 about the idler shaft 327, and to cause the friction roller 331 to rotatably engage or disengage the flywheel 317. FIG. 20 depicts the pivotable housing 329 in the engaged or winding condition, i.e., during engine coast down. The friction roller 331 meshes with the flywheel 317 such that clockwise rotation of the flywheel 317 rotates the friction roller 331 and the pinion shaft 325 in the counterclockwise direction. As a result, the lower pinion gear 343 rotates the idler gear 345 in the clockwise direction.

FIG. 21 depicts the pivotable housing 329 in the disengaged position, wherein the control cable 389 has been used to move the pivotable housing 329 outward such that the friction roller 331 no longer meshes with the flywheel 317. When the pivotable housing 329 is rocked away from the flywheel 317, the bump pin 385 engages the pawl 377 and forcibly disengages the pawl 377 from the ratchet wheel 347 such that the idler shaft 327 can then rotate in the counterclockwise direction.

Now referring to FIGS. 22 and 23, the input assembly 323 is rotatably engageable with a transmission or drive means that includes a main gear 399 mounted about the crankshaft 315. The idler gear 345 meshes with the main gear 399 such that, when the pawl 377 engages and interlocks with the ratchet wheel 347, the main gear 399 is also interlocked. Referring to FIG. 22, the main gear 399 is mounted about a drive coupling 401, and a spring arbor 405 is mounted concentrically about a portion of the coupling 401. The spring arbor 405 includes a projection (not shown) onto which an inside end 415 of the power spring 321 is engageable.

The power spring 321 is mounted within a drive housing or spring housing 407 having a horizontal upper cover 409 and an open bottom. The spring housing 407 also has a circumferential outer wall 411 that surrounds and encloses an outer end 413 of the power spring 321. The outer end 413 of the power spring 321 is fixedly connected to the spring housing 407.

When the main gear 399 is rotated in the counterclockwise direction by the idler gear 345, the spring arbor 405 is rotated to wind the power spring 321. When the pawl 377 engages and interlocks the ratchet wheel 347, the wound power spring 321 is prevented from unwinding.

Referring to both FIGS. 20 and 22, a spring output means or output element includes a unidirectional clutch assembly 403 mounted about the crankshaft 315 and positioned above the spring arbor 405 and the main gear 399. The clutch assembly 403 includes a ratchet 417, a clutch housing 419, a clutch cover 421, and clutch balls 423. The ratchet 417 is fixedly mounted to the spring arbor 405 and is, therefore, rotatable with the arbor 405 and with the coupling 401. Thus, the ratchet 417 is rotatably driven by the main gear 399 in the counterclockwise direction when the main gear 399 is rotated by the input assembly 323. Conversely, the ratchet 417 rotates with the arbor 405 in the clockwise direction when the power spring 321 is unwinding.

The ratchet 417 includes a plurality of evenly-spaced projections or cams 425 which are inclined in one side and recessed in an opposite side. The clutch housing 419 is mounted concentrically about the ratchet 417 and is fixedly interconnected with the crankshaft 315 through the flywheel 317. The clutch housing 419 defines a generally cup-shaped recess 427 wherein the clutch balls 423 are maintained, and pockets 429 in the recess 427 which are located radially outward from the ratchet 417. Finally, the clutch cover 421 extends from the periphery of the clutch housing 419 to the ratchet 417 to enclose the recess 427. As will be explained below, the ratchet 417 is rotatable at a certain speed range in the clockwise or starting direction to rotatably drive the clutch housing 419, but is inoperative to rotatably drive the clutch housing 419 in the reverse or counterclockwise direction.

The clutch housing 419 further includes a plurality of radially inwardly facing cam surfaces 431 against which the clutch balls 423 can be wedgingly engaged by the cams 425 of the ratchet 417. Engagement of the clutch assembly 403 takes place when a cam 425 of the ratchet 417 wedges a clutch ball 423 against an adjacent cam surface 431 (as shown in FIG. 21). Such engagement is effected when the power spring 321 is allowed to unwind and rotatably drive the spring arbor 405 and the ratchet 417 in the clockwise direction. The clutch assembly 403 then rotatably drives the flywheel 317 and crankshaft 315 in the clockwise or starting direction to drive the engine 313 through initial starting revolutions.

As the engine 313 begins to turn over under its own power and reaches running speeds, sufficient centrifugal force acts on the clutch balls 423 to throw the clutch balls 423 outward into the pockets 429 and away from the cams 425. As a result, the ratchet 417 overruns the clutch housing 419 and the clutch assembly 403 is, thereby, rotatably disengaged from the flywheel 317.

FIG. 20 depicts the engine starting device in the winding condition. As described previously, the winding condition may be effected upon operation of a manual actuator, such as a bail handle or push button that is interconnected with the control cable 389 (e.g., release of the bail handle). A return spring 433 is attached between the right flanges 359 and the engine housing 319 and biases the pivotable housing 329 toward the flywheel 317. Upon release of the control cable 389, force of the return spring 433 rocks the pivotable housing 329 about the idler shaft 327 and inwardly toward the flywheel 317 until the friction roller 331 rotatably engages the flywheel 317, as the flywheel 317 rotates in the clockwise or starting direction (i.e., during engine coastdown). Further, the idler gear 345 rotates the main gear 399 in the counterclockwise direction, thereby winding the power spring 321. The ratchet 417 of the clutch assembly 403 also rotates in the counterclockwise direction; however, the cams 425 allow the ratchet 417 to pass over the clutch balls 423 when the clutch balls 423 are engaged between the cams 425 and the cam surfaces 431. Thus, the clutch assembly 403 is rotatably disengaged from the flywheel 317.

When the power spring 321 is wound to a predetermined number of revolutions, the clutch assembly 333 is actuated so that the friction roller 331 is disengaged from the pinion shaft 325. When this occurs, rotation of the flywheel 317 no longer effects rotation of the main gear 399 and further winding of the power spring 321. Accordingly, the clutch assembly 333 prevents overwinding of the power spring 321.

When shutdown of the engine 313 is initiated (e.g., through release of a bail handle), a flywheel brake assembly (not shown) engages the flywheel 317 to stop rotation of the flywheel 317. The control cable 389 may be interconnected with the flywheel brake assembly such that, upon release of a manual actuator (not shown), both the flywheel brake assembly and the input assembly 323 of the engine starting device are activated. In this respect, the engine starting device assists in braking the flywheel 317 by absorbing the angular momentum of the flywheel 317 and crankshaft during engine coast down with the power spring 321. In further embodiments, the flywheel brake assembly may be eliminated such that the engine starting device provides the sole braking mechanism for the flywheel 317, crankshaft 315, and other output device.

Figure 25:
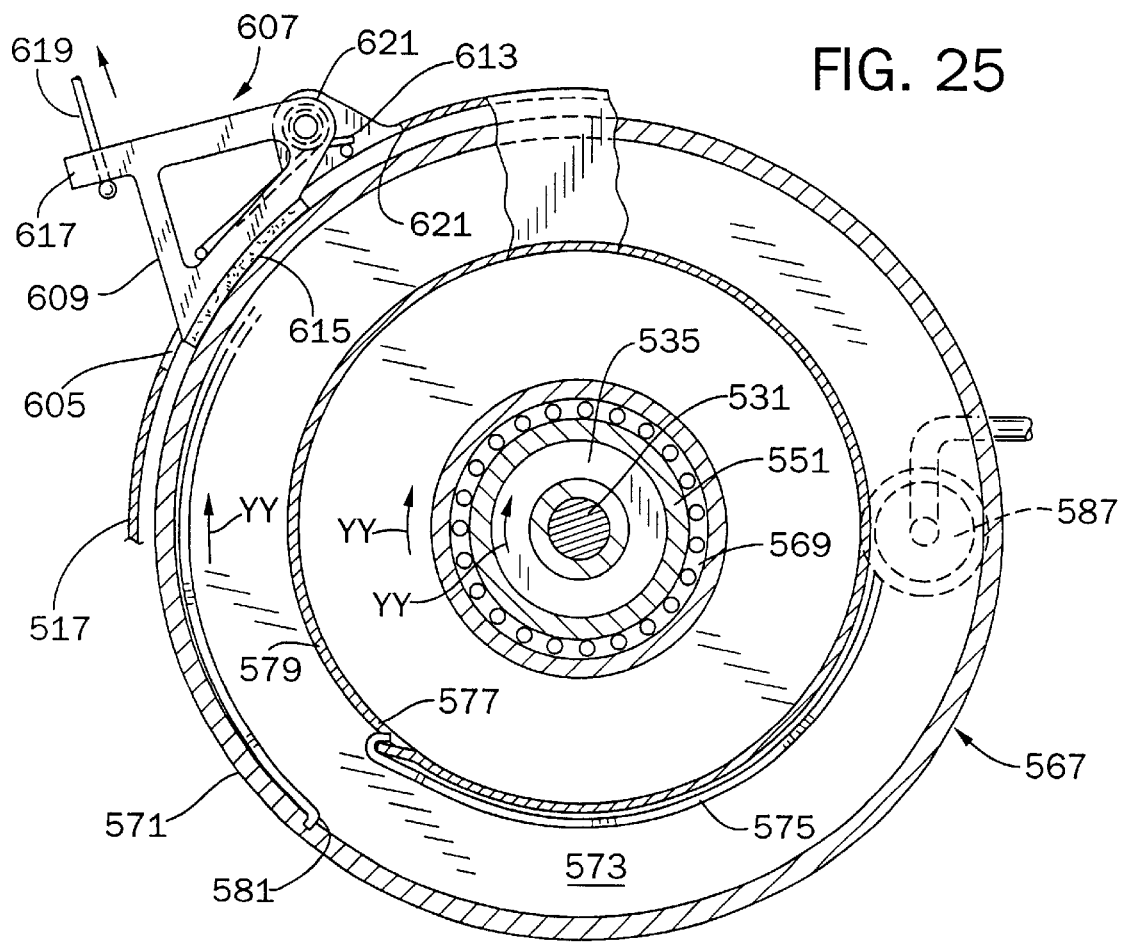
FIG. 25 is a top cross-sectional view through line 25—25 of FIG. 24.
Figure 24:
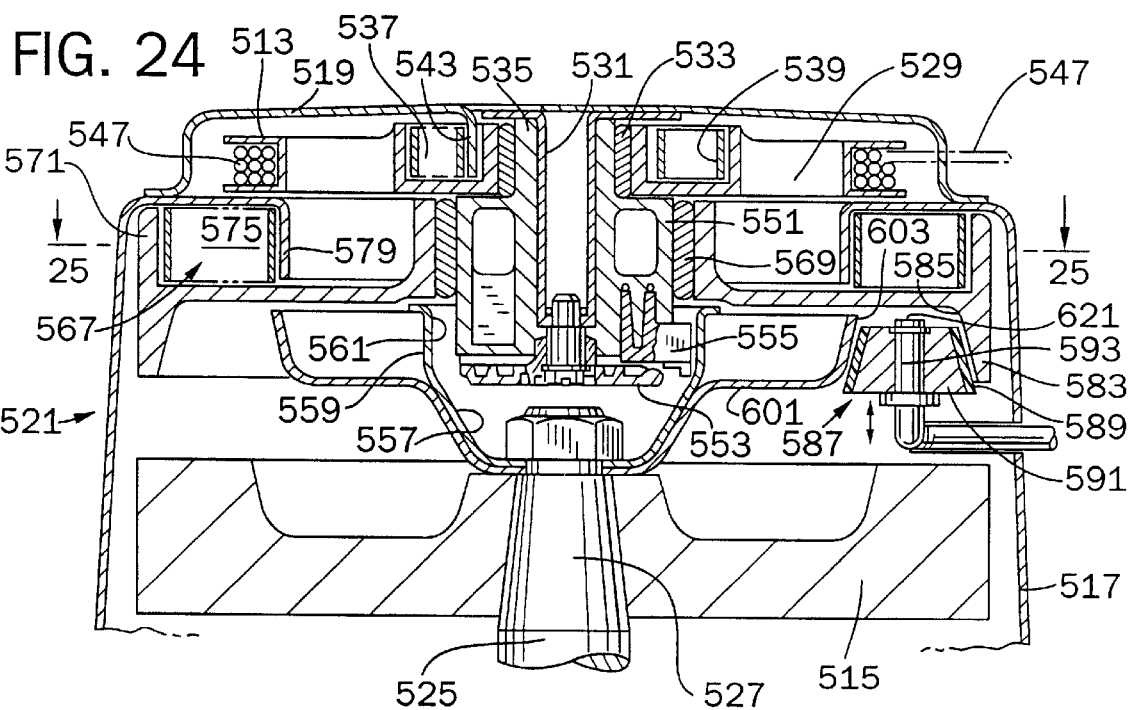
FIG. 24 is a side cross-sectional view of a third embodiment of the invention.

FIGS. 24 and 25 depict a third engine starting device according to the invention and applied to an internal combustion engine 521 having a vertical crankshaft 525. The engine starting device is mounted between a conventional recoil starter 513 and a flywheel 515 rotatably supported on an input end 527 of the crankshaft 525. In this regard, the engine starting device may be referred to as an over-the-flywheel version of the engine starting device according to the invention.

Referring to FIG. 24, the engine 521 includes a lower shroud 517 that surrounds the engine starting device and the flywheel 515, and an upper housing 519 that substantially covers the recoil starter 513. The recoil starter 513 includes a recoil spool or pulley 529 rotatably mounted about a drive member or drive shaft 531 through a clutch assembly 533. Further, a downwardly extending starter hub 535 is rotatably mounted about the drive shaft 531 between the clutch assembly 533 and the drive shaft 531.

The recoil pulley 529 is formed with an upwardly facing groove or recess 537 around the clutch assembly 533 wherein a recoil spring 539 is contained. The recoil spring 539 is fastened to a downwardly extending stationary flange 543 on one end and then to the recoil pulley 529 on an opposite end. Further, the recoil pulley 529 is equipped with a perimeter groove wherein a coiled starter rope 547 is retained. The starter rope 547 extends through an opening (not shown) in the upper housing 519, and is equipped with a handle end (not shown) that may be pulled by an operator to rotate the recoil pulley 529 in the clockwise direction.

The starter hub 535 extends downwardly about the drive shaft 531 and includes a radially extended lower hub portion 551 disposed below the recoil pulley 529. An operator block 553 is bolt-mounted but frictionally rotatable to the bottom of the drive shaft 531 and adjacent the lower hub portion 551. As is conventional, a plurality of spring-biased clutch dogs 555 are pivotably housed within the lower hub portion 551 and adjacent the operator block 553. When the recoil pulley 529 is rotated in the clockwise direction by pulling the starter rope 547, the clutch dogs 555 are pivoted radially outward by the operator block 553.

Disposed below the operator block 553, an annular starter cup 557 is rotatably mounted to the input end 527 of the crankshaft 525 and above the flywheel 515. The starter cup 557 extends radially and upwardly from the input end 527 and includes an outer rim portion 559 that surrounds the lower hub portion 551 and the operator block 553. The starter cup 557 is provided with substantially radially extending abutment surfaces 561 on the inside of the outer rim portion 559. When the clutch dogs 555 are pivoted radially outward (i.e., by pulling starter rope 547), the clutch dogs 555 engage the abutment surfaces 561 to rotatably engage the starter cup 557.

The engine 521 may be started by pulling the starter rope 547 to rotate the recoil pulley 529 in the clockwise direction and to rotatably drive the starter hub 535. The clutch dogs 555 rotatably drive the starter cup 557 in the clockwise direction and the starter cup 557 drives the crankshaft 525, also in the clockwise direction, to start the engine 521.

Referring to both FIGS. 24 and 25, the engine starting device includes an annular drive housing 567 ("spring housing"). The spring housing 567 is mounted about the lower hub portion 551 of the starter hub 535 through a unidirectional clutch assembly 569. The spring housing 567 includes an outer perimeter wall 571 that forms, in conjunction with a downwardly extending stationary support flange 579, an annular casing wherein a power spring 575 is retained. The power spring 575 or alternative elastic member is preferably formed from a metallic band about one inch wide. As best shown in FIG. 25, an inner end or edge 577 of the power spring 575 is engageable with the stationary flange 579, while an outer end 581 of the power spring 575 is fixed to the outer wall 571 of the spring housing 567. In an alternative embodiment, the inner end 577 may be looped to engage the stationary flange 579 via an eyelet, as in the first embodiment of the invention (e.g., see FIG. 8).

The power spring 575 may be wound by rotating the spring housing 567 in the counterclockwise direction. The unidirectional clutch assembly 569 is designed to allow the spring housing 567 to rotatably engage the starter hub 535 when the spring housing 567 rotates in the clockwise direction but not when the spring housing 567 rotates in the counterclockwise direction.

The spring housing 567 includes a circumferential flange 583 that extends downwardly from the outer wall 571 and is formed with an inwardly facing tapered surface 585. A friction roller 587 is disposed adjacent the spring housing 567. The friction roller 587 also has a tapered outer surface 589 that is preferably formed from a rubber material and a core 591 that may be formed from a metallic or plastic material. The friction roller 587 is rotatably mounted on a shaft 593 that is attached to a lever arm 549. The lever arm 549 may be interconnected with a control assembly (not shown) remotely disposed from the engine 521, and operable to manipulate the lever arm 549 to move the friction roller 587 upwardly or downwardly relative to the spring housing 567.

The engine starting device also includes a rewind cup 601 that is rotatably mounted onto the input end 527 of the crankshaft 525. As shown in FIG. 24, the rewind cup 601 extends radially and upwardly outside of the starter cup 557, and includes a substantially axially extending tapered surface 603. The tapered surface 603 mirrors the tapered surface 585 of the spring housing 567 and forms a wedge shaped recess 621 therebetween.

The rewind cup 601 is rotated by the crankshaft 525 in the clockwise direction during engine running conditions and during engine coast down. During engine coast down, the friction roller 587 is moved upwardly into engagement with both the rewind cup tapered surface 603 and the spring housing tapered surface 585. Accordingly, the rewind cup 601 rotates the friction roller 587 in the counterclockwise direction and the friction roller 587 rotates the spring housing 567 in the counterclockwise direction. As a result, the crankshaft 525 indirectly winds the power spring 575 as the crankshaft 525 rotates during engine coast down.

Now referring to FIG. 25, the engine starting device includes a spring actuated brake assembly 607 extending through an opening 605 in the lower shroud 517 and mounted adjacent the outer wall 571 of the spring housing 567. The brake assembly 607 includes a pivotable bracket 609 mounted upon a pivot post 623 and engaging a torsion spring 613. The torsion spring 613 functions to bias the bracket 609 radially inward toward the outer wall 571 of the spring housing 567. The brake assembly 607 also includes an arcuate shaped shoe 615 that is frictionally engageable with the outer wall 571 and a control cable 619 that is connected with a lever arm 617 of the bracket 609.

In one form of the invention, the control cable 619 is operatively interconnected with a dead man handle (not shown). When the dead man handle is depressed, the control cable 619 pivots the bracket 609 outwardly to pull the shoe 615 away from the outer wall 571. Conversely, when the dead man handle is released, the torsion spring 613 pivots the bracket 609 inwardly such that the shoe 615 frictionally engages the outer wall 571. As a result, the brake assembly 607 resists and stops clockwise rotation of the spring housing 567.

When the dead man handle is released, the friction roller 587 moves into engagement between the spring rewind cup 601 and the spring housing 567, at about the same time that the brake assembly 607 engages the outer wall 571 of the spring housing 567. In this way, the engine starting device also acts as a brake mechanism for the flywheel 515, crankshaft 525 and engine 521. In alternative embodiments, the engine starting device is designed to operate such that the friction roller 587 first interconnects the spring rewind cup 601 and the spring housing 567 before the brake assembly 607 engages the outer wall 571 of the spring housing 567. This delay ensures full winding of the power spring 575, but the actuation of the brake assembly is timed such that the power spring is prevented from overwinding.

To subsequently start the engine 521, the dead man handle is depressed so that the brake assembly 607 and the friction roller 587 are removed from their respective frictionally engaging positions. As a result, the stored energy of the wound power spring 575 is released to rotate the spring housing 567 in the clockwise or starting direction (designated by arrows YY in FIG. 25). Further, the spring housing 567 drives the unidirectional clutch assembly 569 and rotates the starter hub 535 also in the clockwise or starting direction YY. Further yet, clockwise rotation of the starter hub 535 rotatably drives the starter cup 557 through engagement by the clutch dogs 555, thereby rotating the crankshaft 525 in the starting or clockwise direction.

In an alternative version of this engine starting device embodiment, the energy stored in the wound power spring 575 may be used as a power assist to the recoil starter pulley 529. The wound power spring 575 may be set for release upon an increase in the force exerted in the starter rope 547. More particularly, when the force in the starter rope 547 drops below a predetermined level, the brake assembly 607 may be reapplied to stop the spring housing 567, in which case, the energy remaining in the power spring 575 can be used for additional starting attempts.

While several embodiments of the present invention have been shown and described above, alternate embodiments will be apparent to those skilled in the art and are within the intended scope of the present invention. Therefore, the invention is to be limited only by the following claims.

What is claimed is:

1. An internal combustion engine comprising:
   an engine housing;
   a crankshaft supported within said engine housing for rotation with respect to said engine housing;
   a flywheel fixedly mounted to said crankshaft and rotatable with said crankshaft in a starting direction to start said engine;
   a coil spring having an outer end fixedly interconnected with respect to said engine housing, and an inner end;
   a unidirectional clutch having a portion connected to said inner end of said spring, said unidirectional clutch having an engaged condition in which said unidirectional clutch couples said inner end of said spring to said flywheel such that said flywheel and crankshaft may be rotated in the starting direction in response to unloading of said spring, and a disenged condition in which said inner end of said spring is uncoupled from said flywheel;
   an input assembly interconnected with said spring and selectively movable into contact with said flywheel to load said spring in response to rotation of said flywheel;
   a locking mechanism selectively preventing said spring from unloading; and
   at least one manual actuator actuable to disengage said locking mechanism from said spring to enable unloading of said spring.

2. The engine of claim 1, wherein said unidirectional clutch includes a centrifugally-responsive member movable between an engaged position in which said unidirectional clutch is in said engaged condition, and a disengaged position in which said unidirectional clutch is in said disengaged condition.

3. The engine of claim 2, wherein said centrifugally-responsive member includes a clutch ball.

4. The engine of claim 2, wherein said centrifugally-responsive member is in said engaged position when said engine is at rest, and wherein said centrifugally-responsive member moves under the influence of centrifugal force to said disengaged position in response to said crankshaft rotating at a rate higher than a preselected rate.

5. The engine of claim 4, wherein said input assembly engages said flywheel during engine coastdown to cause winding of said spring, and wherein said centrifugally-responsive member moves into said engaged position in response to the rotational speed of said flywheel dropping below said preselected rate.

6. The engine of claim 1, wherein said unidirectional clutch includes:
   a clutch housing fixedly mounted to said flywheel, said crankshaft extending through said clutch housing;
   a ratchet positioned within said clutch housing, said crankshaft extending through said ratchet, said ratchet being rotatable with respect to said crankshaft and clutch housing, said inner end of said spring being interconnected with said ratchet; and
   at least one centrifugally-responsive member positioned within said clutch housing and movable between an engaged position in which said at least one centrifugally-responsive member couples said ratchet and clutch housing for rotation together such that said unidirectional clutch is in said engaged condition, and a disengaged position in which said ratchet rotates freely with respect to said clutch housing and said unidirectional clutch is in said disengaged condition.

7. The engine of claim 6, wherein said ratchet includes a plurality of cams each having an inclined side and a recessed side, and wherein said at least one centrifugally-responsive member is wedged between said recessed side of at least one of said cams and a portion of said clutch housing when in said engaged position.

8. The engine of claim 6, wherein said at least one centrifugally-responsive member is biased toward said engaged position under the influence of gravity.

9. The engine of claim 6, wherein said clutch housing includes a plurality of radially inwardly extending projections, and wherein said at least one centrifugally-responsive member is wedged between said ratchet and at least one of said projections when in said engaged position.

10. The engine of claim 9, wherein at least one of said manual actuators is a bail handle.

11. The engine of claim 1, further comprising an overrun clutch operatively disposed between said input assembly and said spring, said overrun clutch limiting the torque transmitted from said input assembly to said spring to a predetermined amount of torque.

12. The engine of claim 1, wherein said spring is coiled around said crankshaft.

* * * * *

UNITED STATES PATENT AND TRADEMARK OFFICE
CERTIFICATE OF CORRECTION

PATENT NO.    : 6,311,663 B2
DATED         : November 6, 2001
INVENTOR(S)   : Gary J. Gracyalny et al.

It is certified that error appears in the above-identified patent and that said Letters Patent is hereby corrected as shown below:

<u>Column 24,</u>
Line 5, "disenged" should be -- disengaged --

Signed and Sealed this

Fourth Day of June, 2002

Attest:

JAMES E. ROGAN
Attesting Officer    Director of the United States Patent and Trademark Office